United States Patent
Ku et al.

(10) Patent No.: US 10,484,609 B2
(45) Date of Patent: Nov. 19, 2019

(54) MOBILE TERMINAL AND METHOD FOR CONTROLLING THE SAME

(71) Applicant: LG ELECTRONICS INC., Seoul (KR)

(72) Inventors: Hyerim Ku, Seoul (KR); Arim Kwon, Seoul (KR); Hyungtae Jang, Seoul (KR); Hyungsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 15/045,138

(22) Filed: Feb. 16, 2016

(65) Prior Publication Data
US 2017/0064206 A1    Mar. 2, 2017

(30) Foreign Application Priority Data
Aug. 27, 2015    (KR) .......................... 10-2015-0121204

(51) Int. Cl.
*H04N 5/232*    (2006.01)
*H04N 5/225*    (2006.01)
(Continued)

(52) U.S. Cl.
CPC ...... *H04N 5/23293* (2013.01); *H04M 1/0264* (2013.01); *H04N 5/2258* (2013.01);
(Continued)

(58) Field of Classification Search
CPC ............. H04N 5/23293; H04N 5/2258; H04N 5/23212; H04N 5/247; H04N 5/2621; H04N 5/2625; H04M 1/0264
(Continued)

(56) References Cited

U.S. PATENT DOCUMENTS

| | | | | |
|---|---|---|---|---|
| 6,621,524 B1 * | 9/2003 | Iijima | .................... | H04N 5/262 |
| | | | | 348/584 |
| 2003/0222888 A1 * | 12/2003 | Epshteyn | ................ | G06T 13/80 |
| | | | | 345/619 |

(Continued)

FOREIGN PATENT DOCUMENTS

EP        2852143        3/2015

OTHER PUBLICATIONS

European Patent Office Application Serial No. 16156670.8, Search Report dated Jan. 13, 2017, 6 pages.

*Primary Examiner* — Twyler L Haskins
*Assistant Examiner* — Zhenzhen Wu
(74) *Attorney, Agent, or Firm* — Lee Hong Degerman Kang & Waimey

(57) ABSTRACT

A mobile terminal includes first and second cameras located on a rear side of the terminal. A controller is included that is configured to cause the display to display a first preview image of a first image received from the first camera, where the first preview image includes an image object corresponding to a specific subject. The controller further selects the image object in response to an input, captures the first image as a still image in response to an image capture request, controls the second camera to capture video that includes the specific subject, and causes the display to display a synthesized image comprising a first area and a second area, where the first area includes portions of the captured first image, and the second area corresponds to the specific subject included in the first image and includes a portion of the captured video.

8 Claims, 24 Drawing Sheets

(51) Int. Cl.
  *H04N 5/262* (2006.01)
  *H04M 1/02* (2006.01)
  *H04N 5/247* (2006.01)

(52) U.S. Cl.
  CPC ......... *H04N 5/23212* (2013.01); *H04N 5/247* (2013.01); *H04N 5/2621* (2013.01); *H04N 5/2625* (2013.01)

(58) Field of Classification Search
  USPC ............................................. 348/333.11, 239
  See application file for complete search history.

(56) References Cited

U.S. PATENT DOCUMENTS

| | | | |
|---|---|---|---|
| 2008/0001950 A1* | 1/2008 | Lin | G06T 13/80 345/473 |
| 2009/0086011 A1 | 4/2009 | Ek et al. | |
| 2014/0292769 A1* | 10/2014 | S V | G06T 13/80 345/473 |
| 2014/0347370 A1* | 11/2014 | Yamano | G06T 13/80 345/473 |
| 2015/0077421 A1* | 3/2015 | Lehtiniemi | H04N 1/387 345/473 |
| 2015/0092066 A1* | 4/2015 | Geiss | H04N 5/2258 348/180 |
| 2016/0028954 A1* | 1/2016 | Abe | H04N 5/23245 345/173 |
| 2016/0198098 A1* | 7/2016 | Song | G06F 3/04845 348/239 |

* cited by examiner

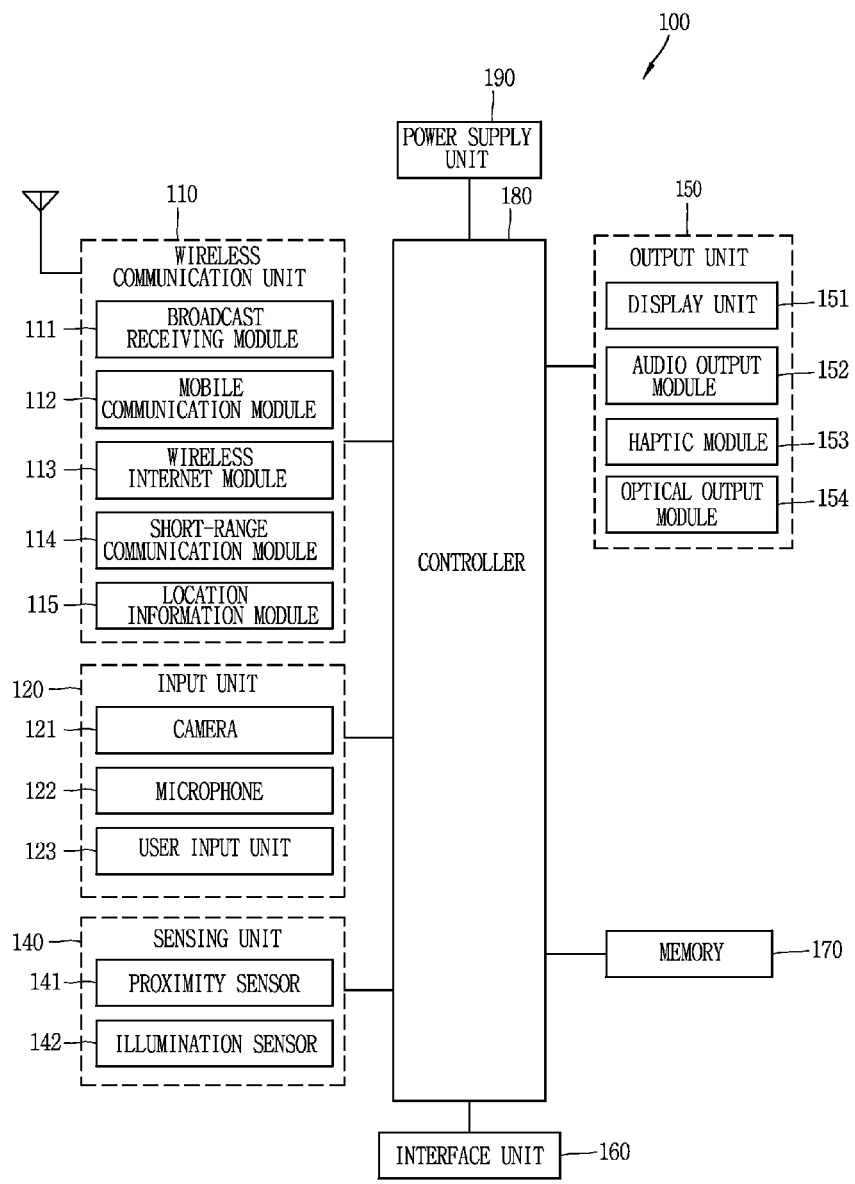

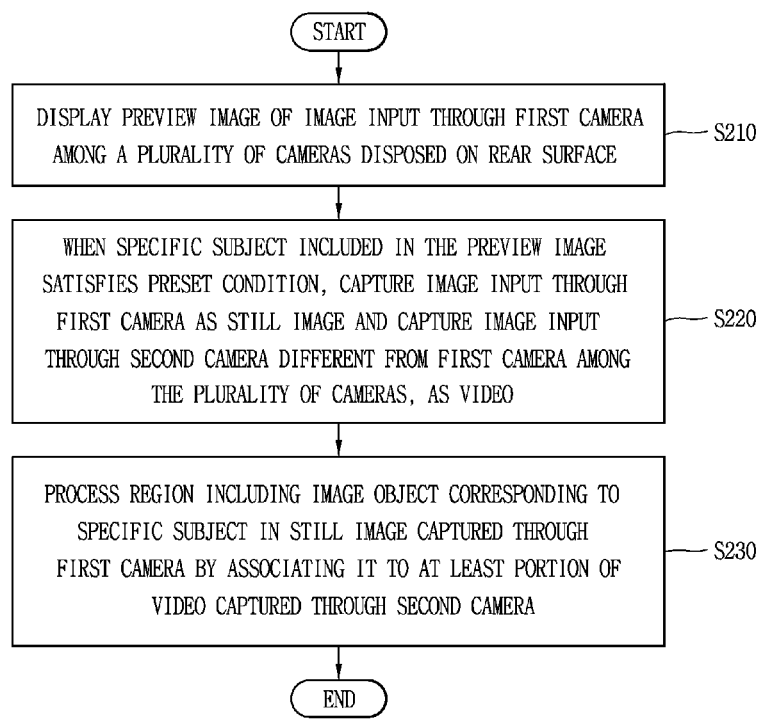

FIG. 3A(1)
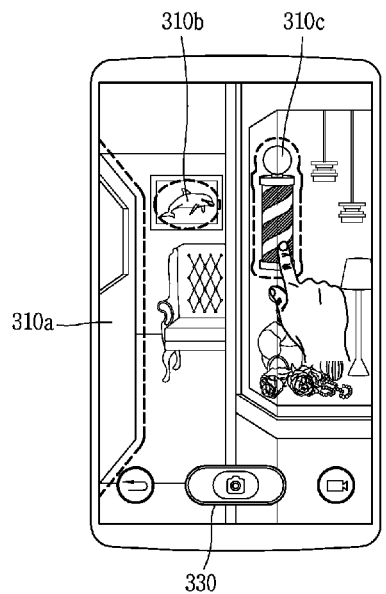
FIG. 3A(2)
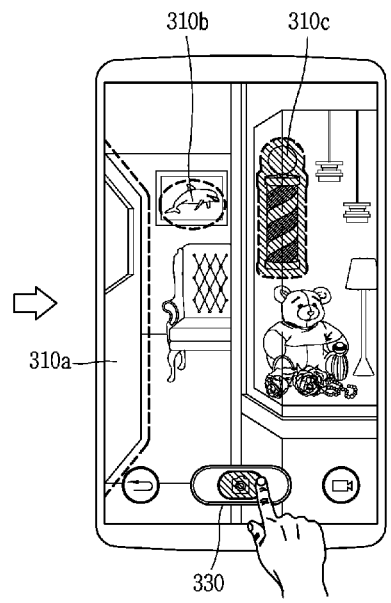
FIG. 3A(3)
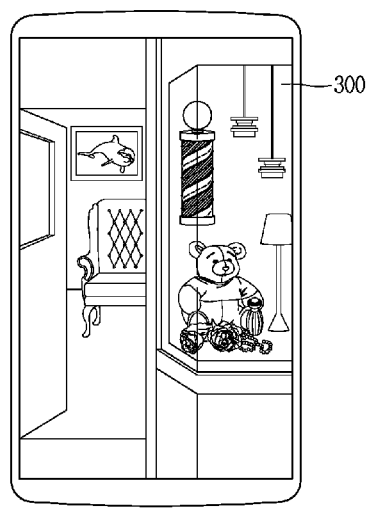

FIG. 3B(1) 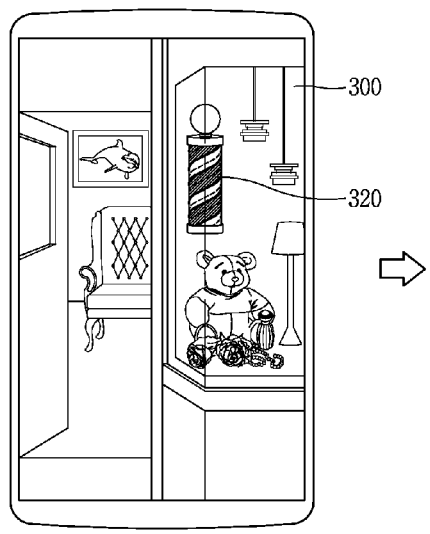 FIG. 3B(2) 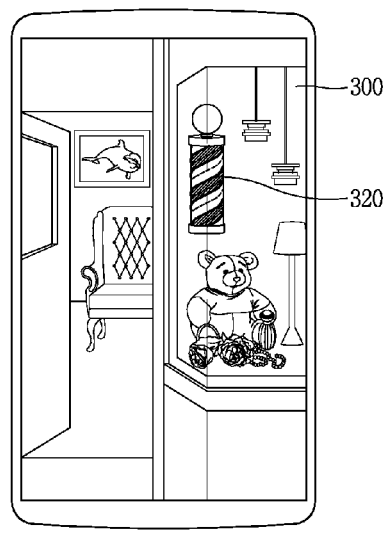

FIG. 4A(1)
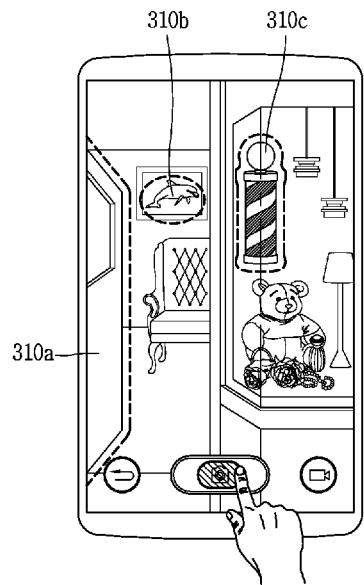
FIG. 4A(2)
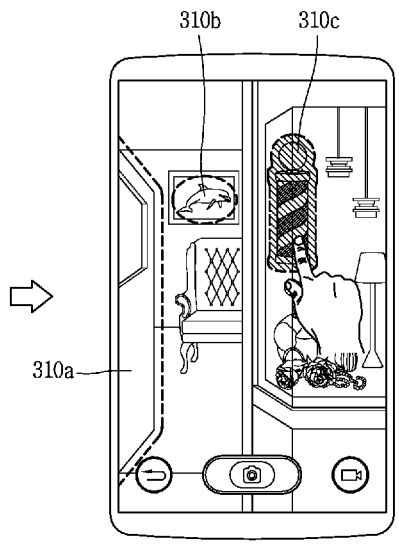
FIG. 4A(4)
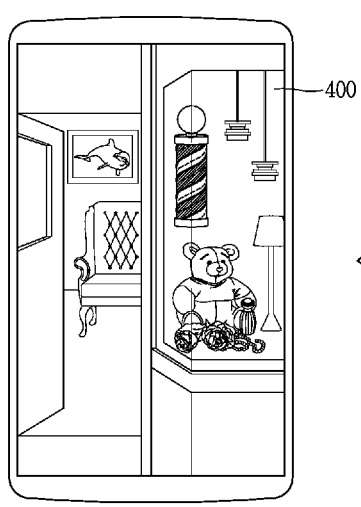
FIG. 4A(3)
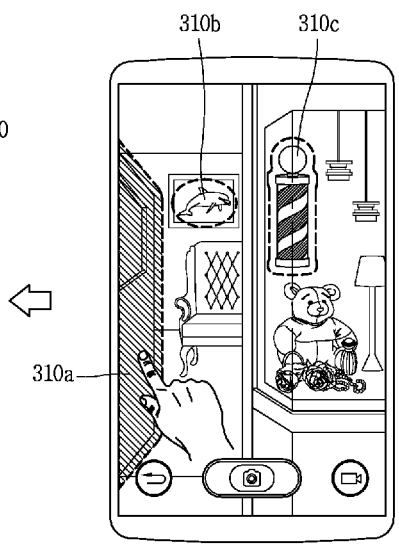

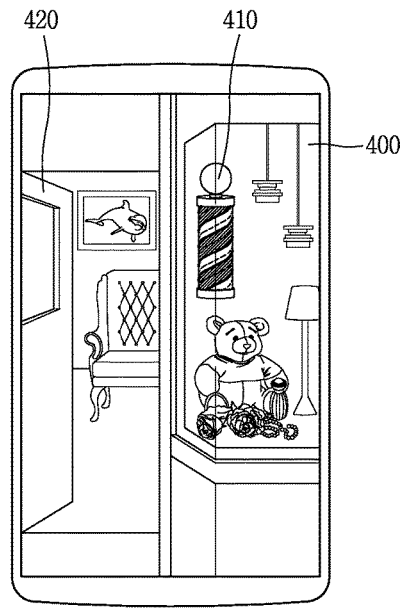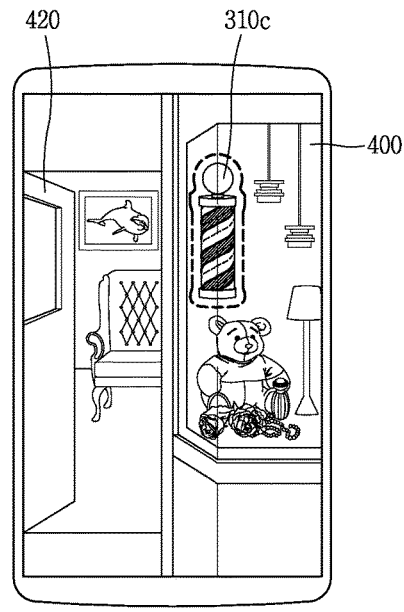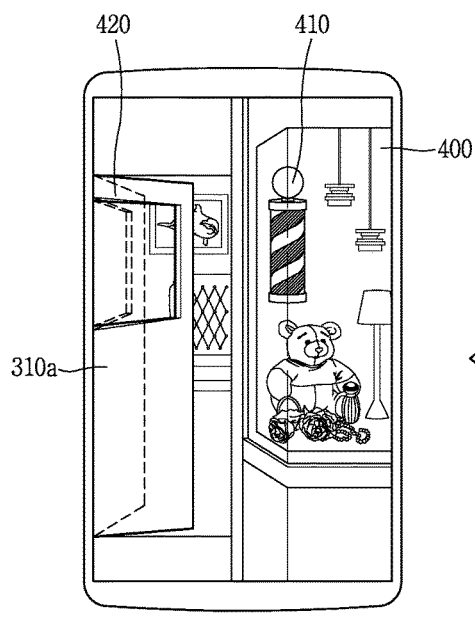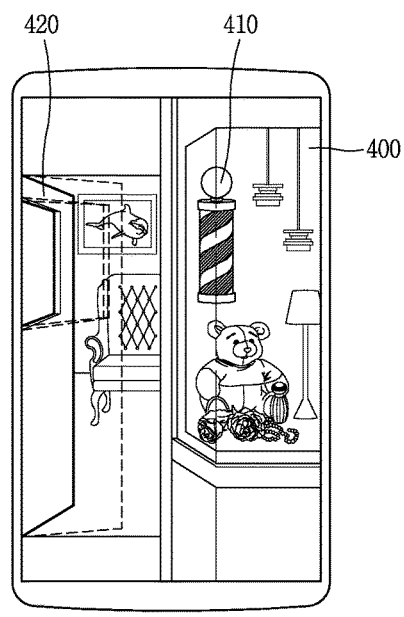

FIG. 5A(1) 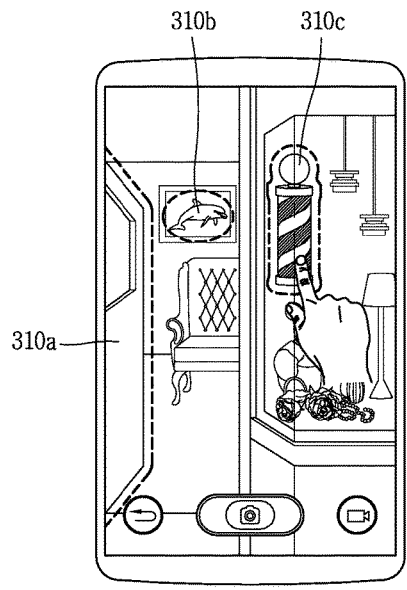
FIG. 5A(2) 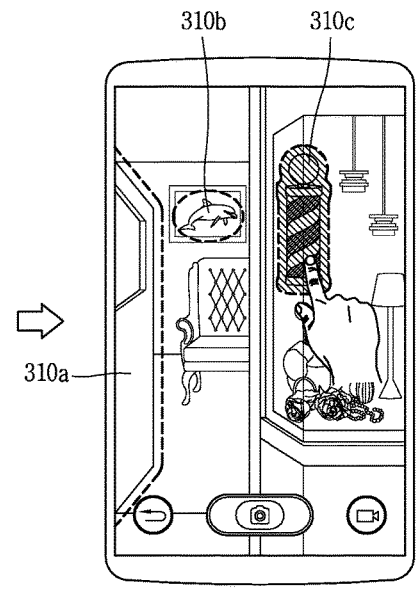
FIG. 5A(3) 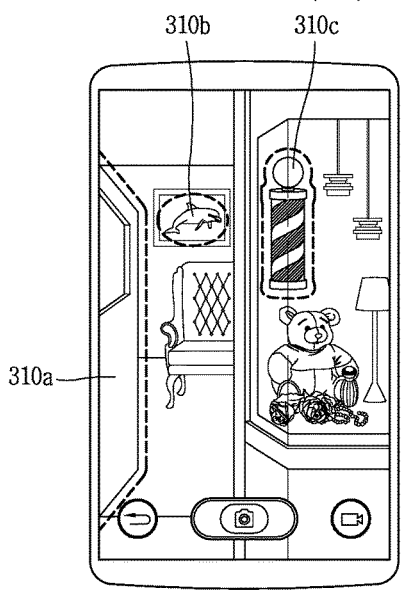

FIG. 5B(1)
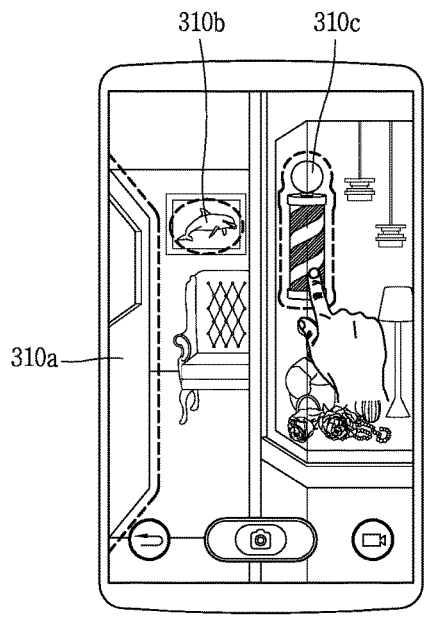
FIG. 5B(2)
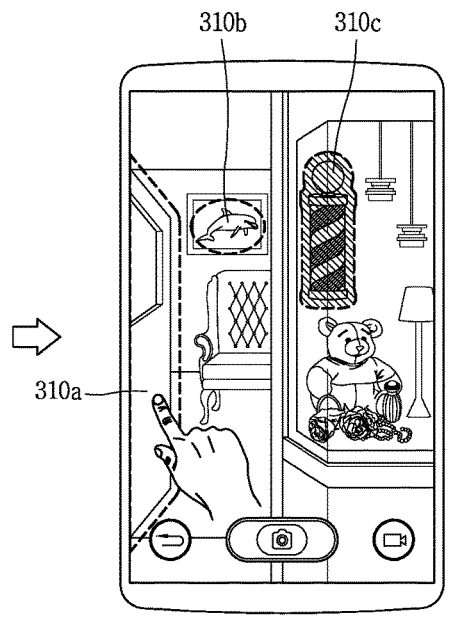
FIG. 5B(3)
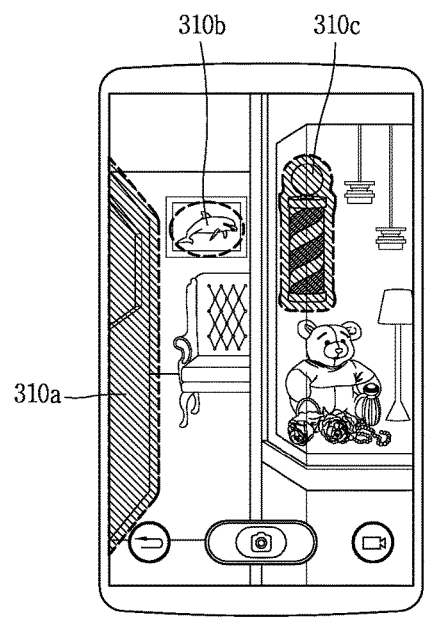

FIG. 6A(1)  FIG. 6A(2)
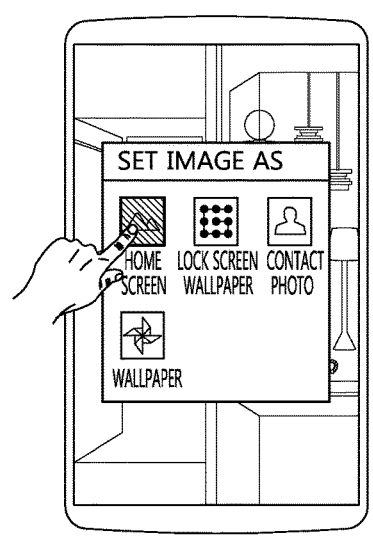 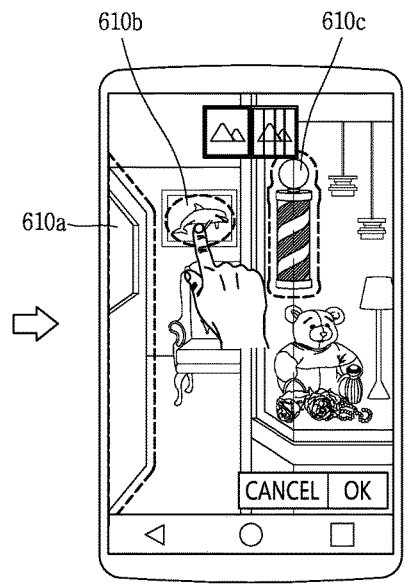
FIG. 6A(4)  FIG. 6A(3)
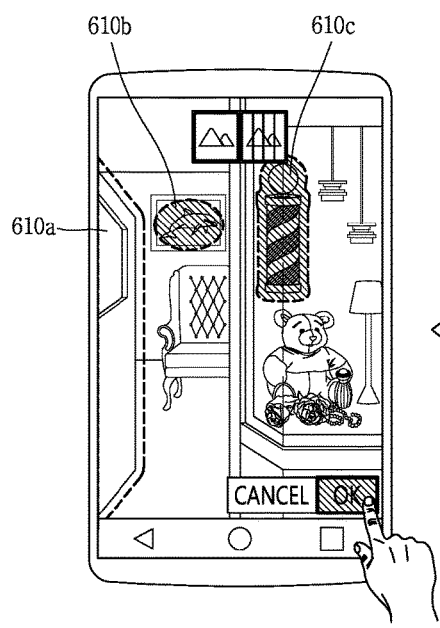 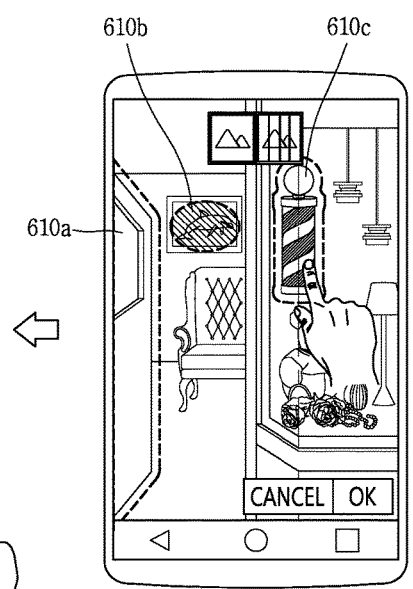

FIG. 6B(1) 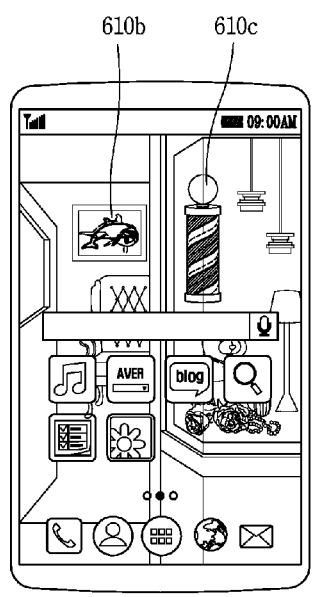 FIG. 6B(2) 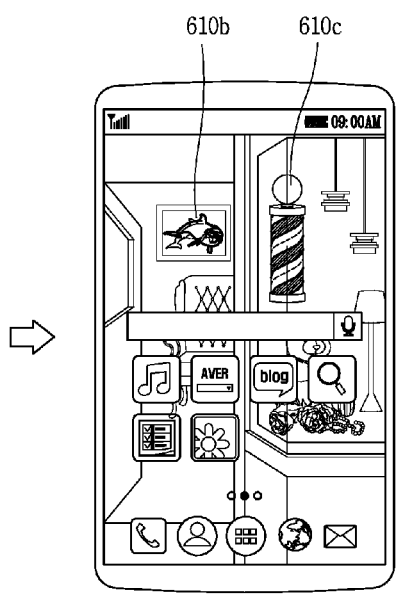

FIG. 7A(1)   FIG. 7A(2)
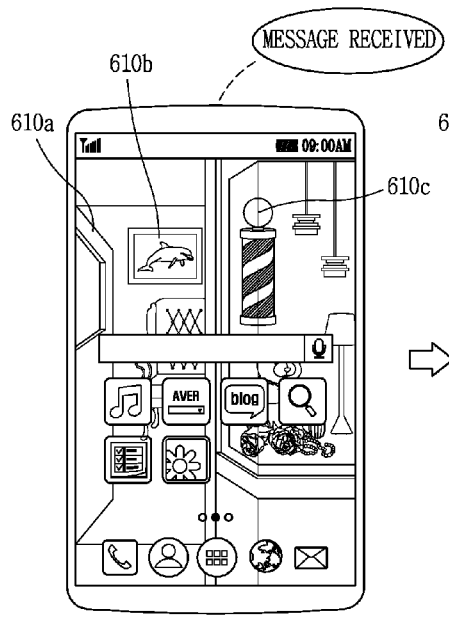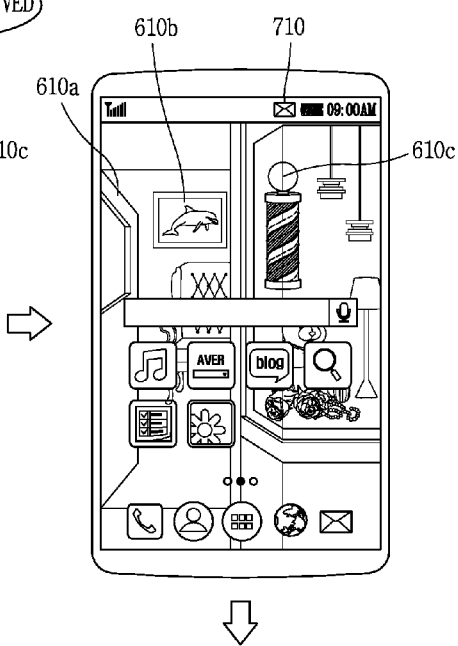
FIG. 7A(3)
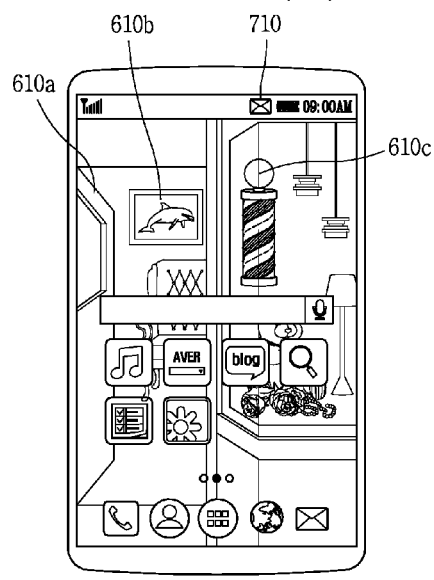

FIG. 7B(1)
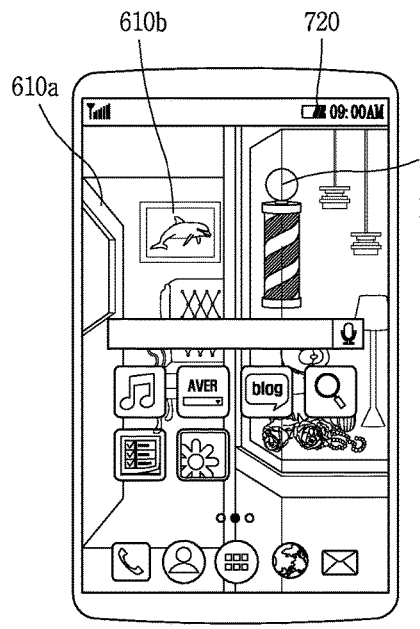
FIG. 7B(2)
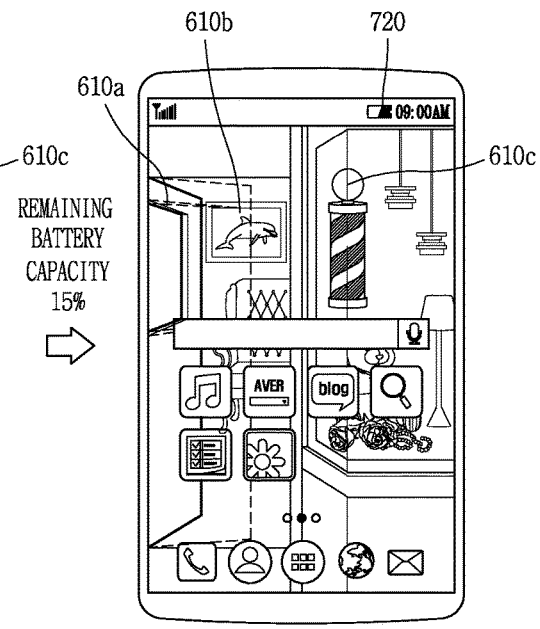
REMAINING BATTERY CAPACITY 15%
REMAINING BATTERY CAPACITY 5%
FIG. 7B(3)
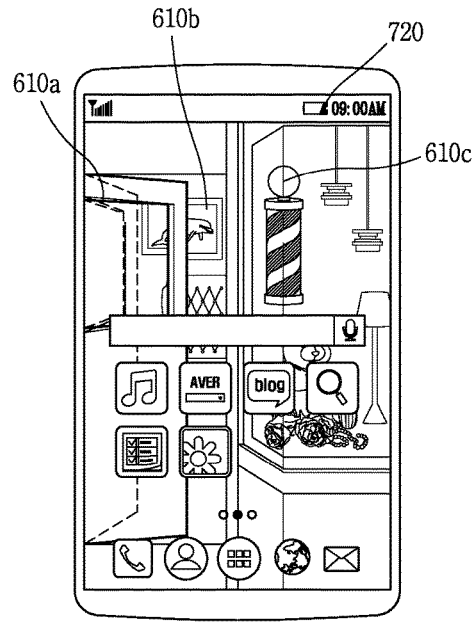

FIG. 8A(1)
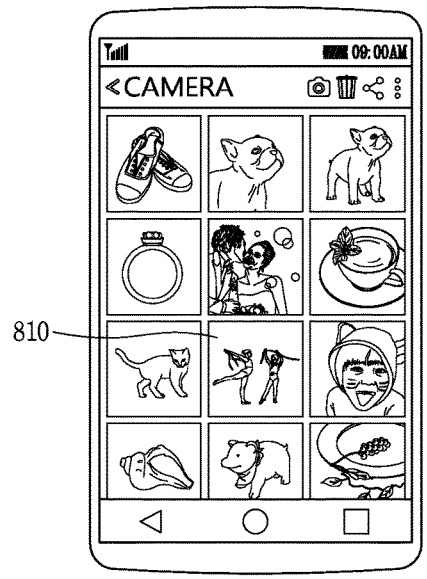
FIG. 8A(2)
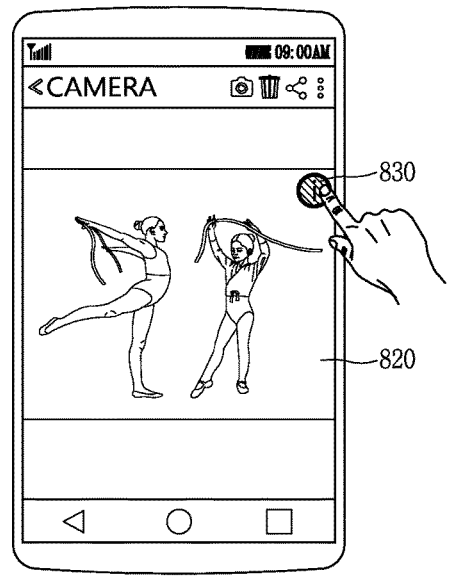
FIG. 8A(4)
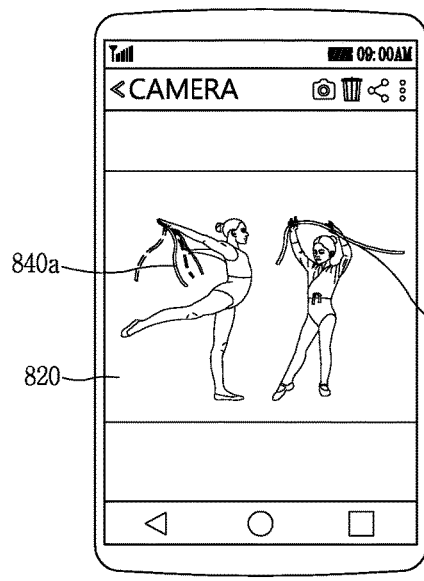
FIG. 8A(3)
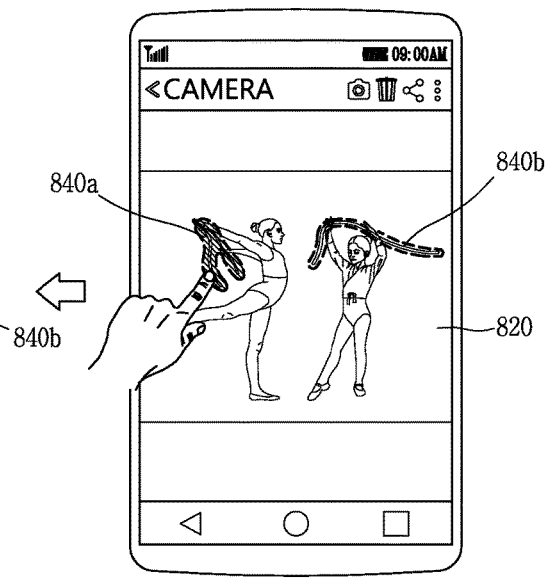

FIG. 8B(1) 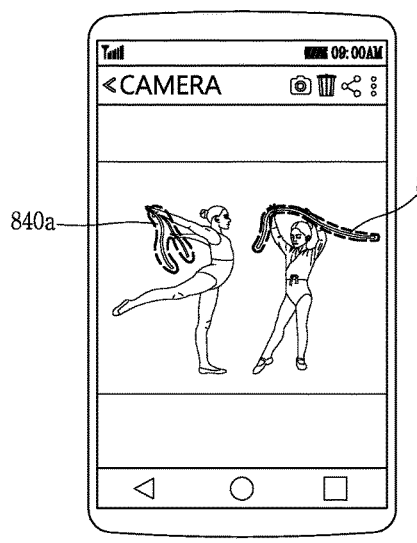
FIG. 8B(2) 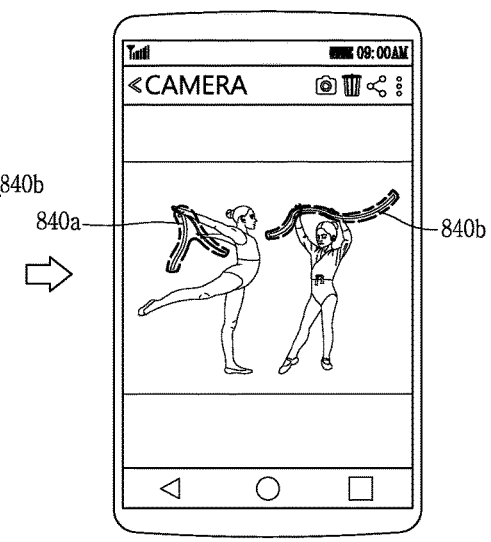
FIG. 8B(3) 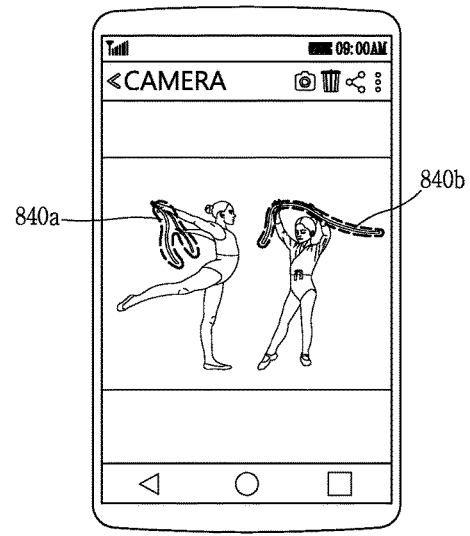

FIG. 9A(1)          FIG. 9A(2)
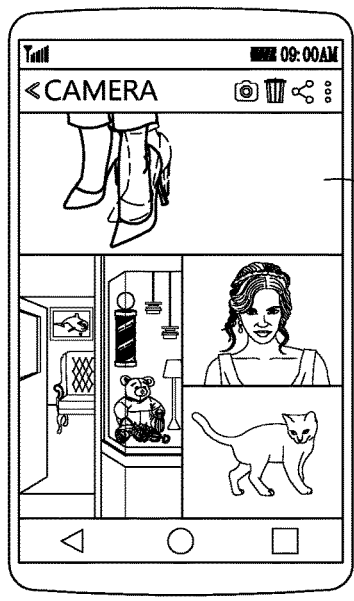 
FIG. 9B(1)          FIG. 9B(2)
 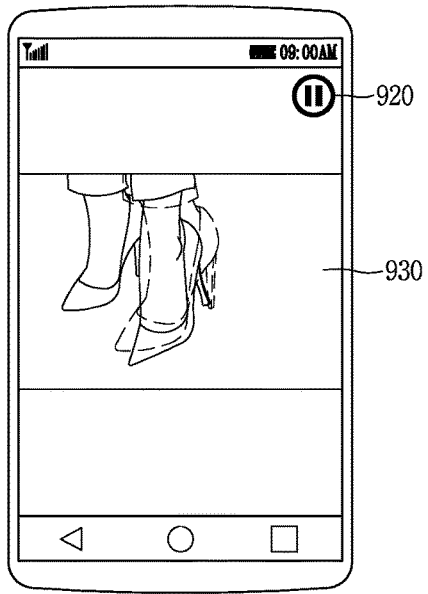

FIG. 10A(1)  FIG. 10A(2)
 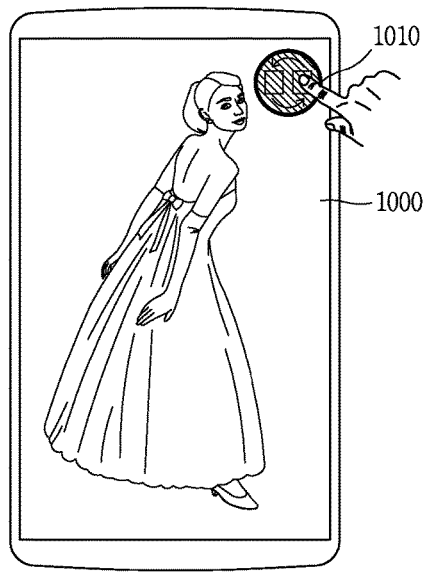
FIG. 10A(4)  FIG. 10A(3)
 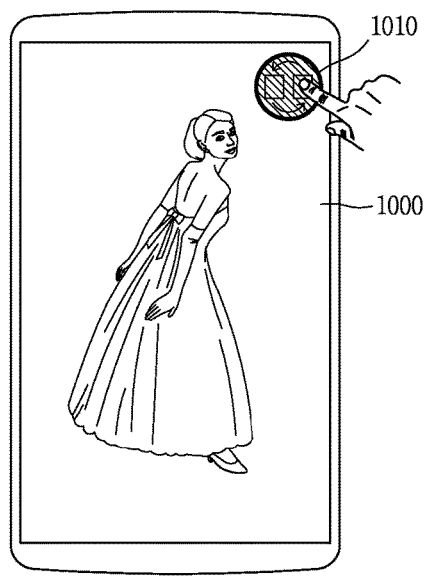

FIG. 10B(1)
FIG. 10B(2)
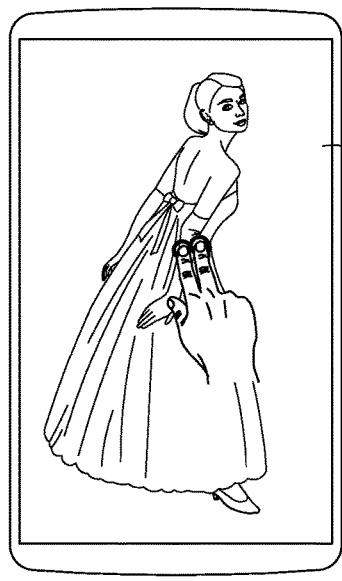
FIG. 10B(4)
FIG. 10B(3)

FIG. 11A(1)
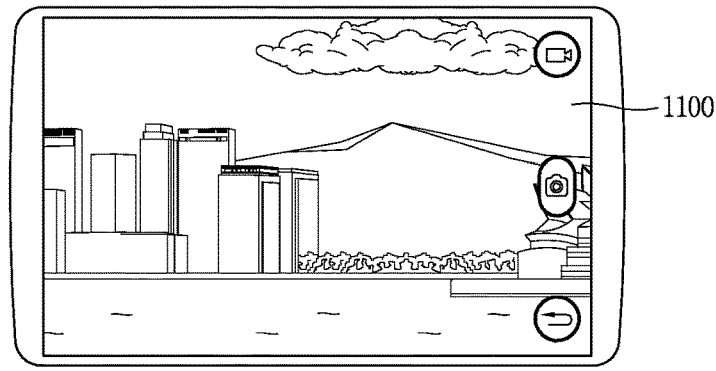
FIG. 11A(2)
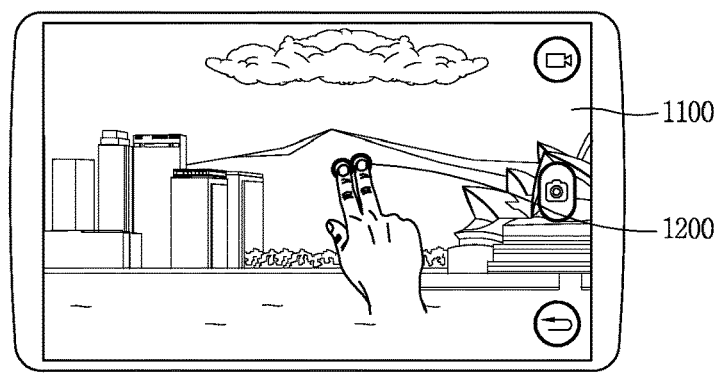
FIG. 11A(3)
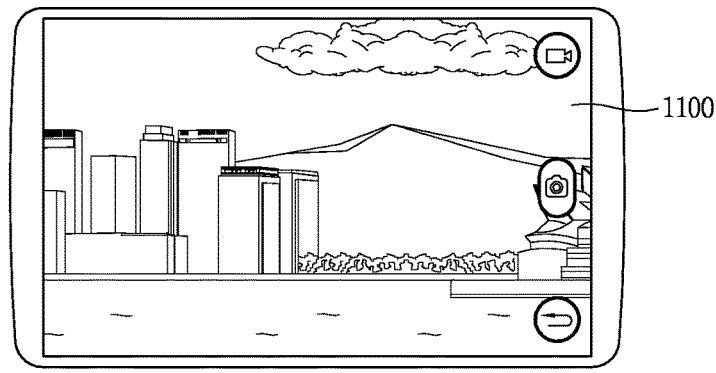

FIG. 11B(1)
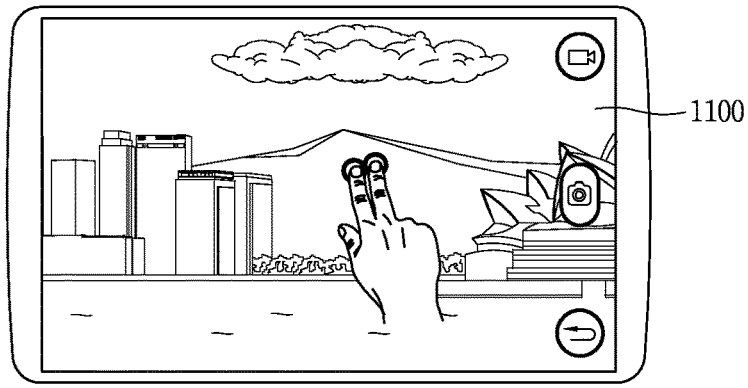
FIG. 11B(2)
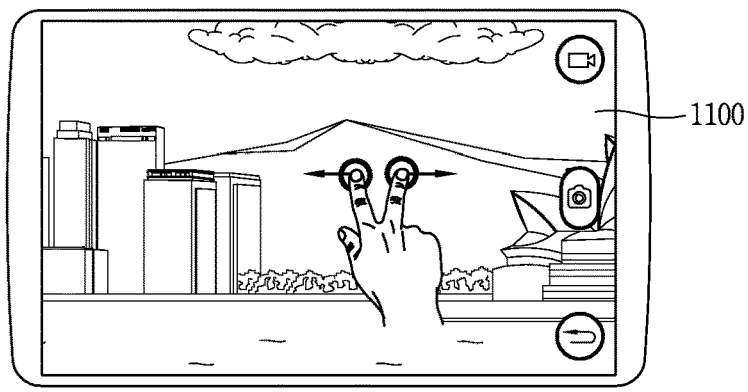
FIG. 11B(3)
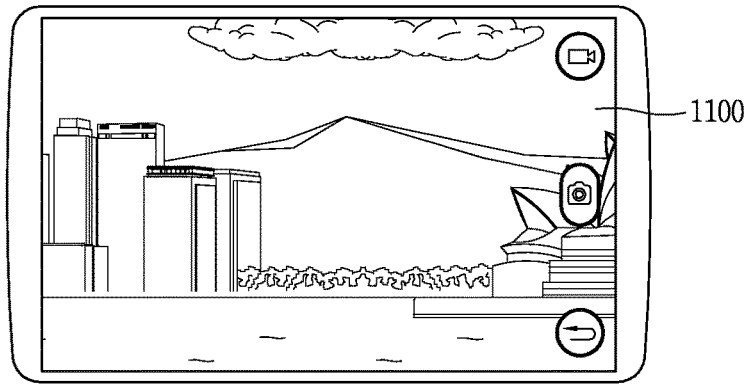

FIG. 12A(1)
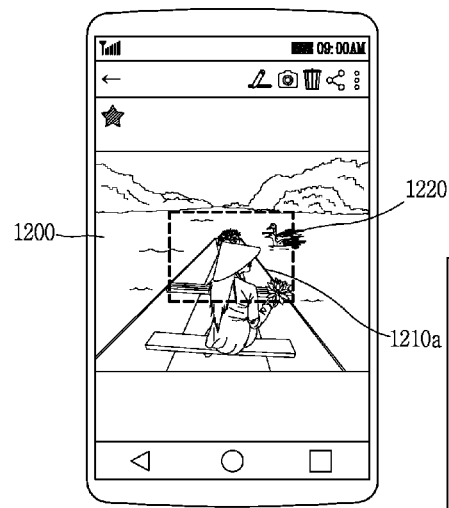
FIG. 12A(2)
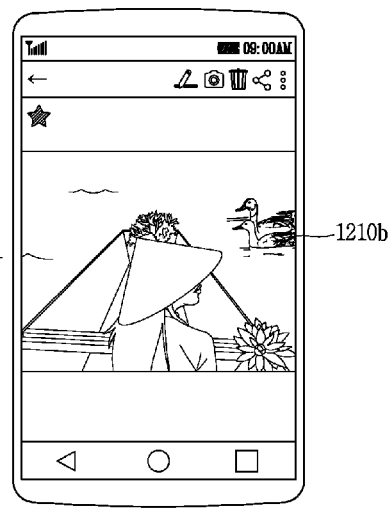
FIG. 12A(3)
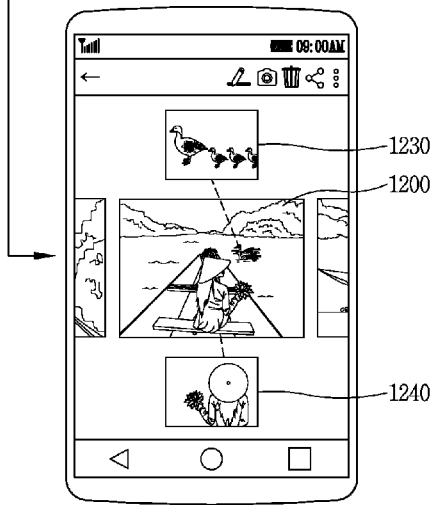

FIG. 12B(1)
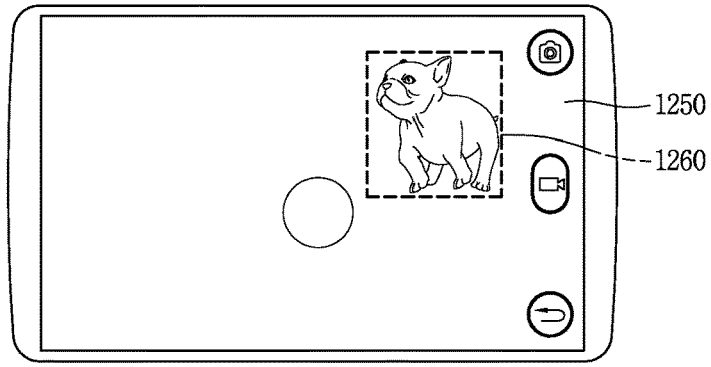
FIG. 12B(2)
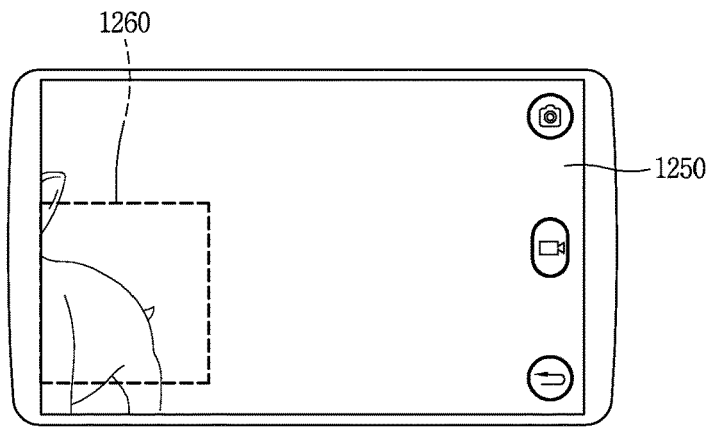
FIG. 12B(3)
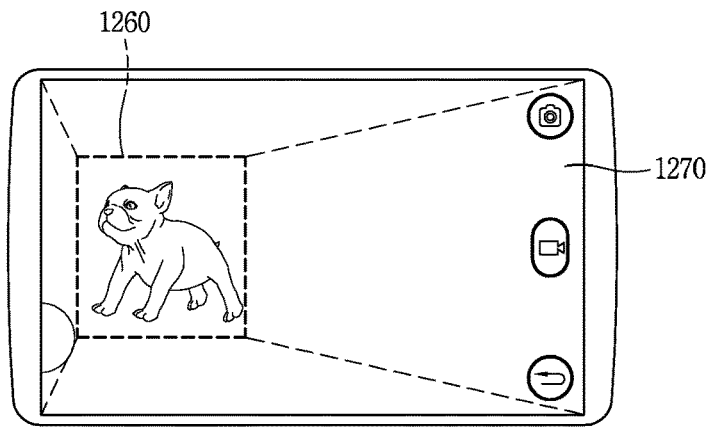

FIG. 12C(1)
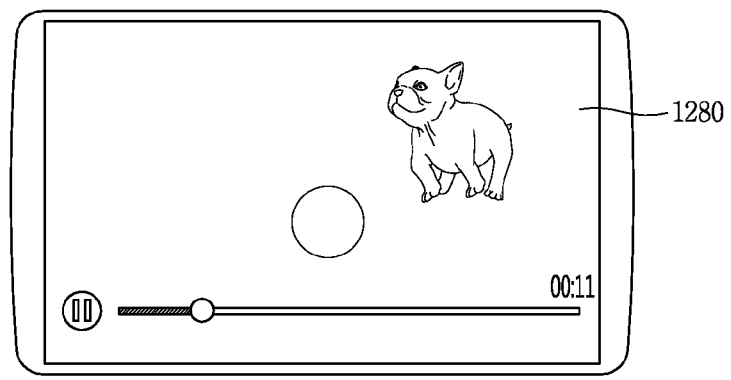
FIG. 12C(2)
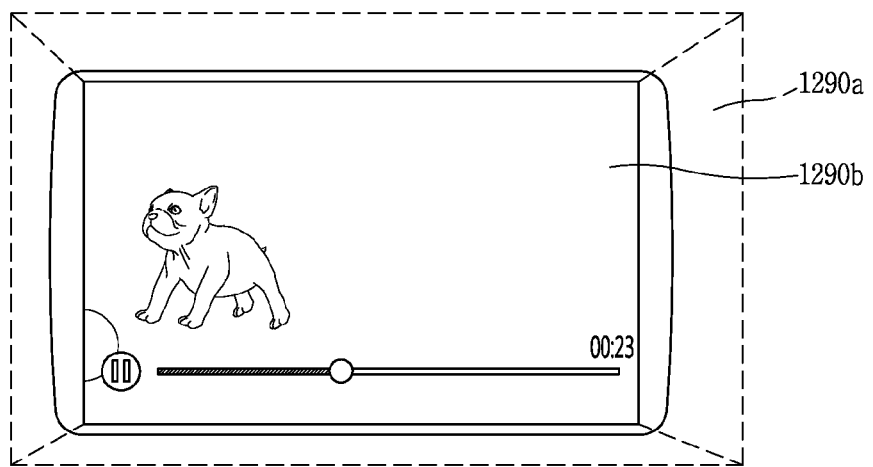

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Application No. 10-2015-0121204, filed on Aug. 27, 2015, the contents of which are incorporated by reference herein in their entirety.

FIELD OF THE INVENTION

The present disclosure relates to a mobile terminal including a plurality of cameras and a method for controlling the same.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components.

Meanwhile, as part of such improvement, a plurality of cameras may be disposed on a mobile terminal. Through the plurality of cameras, the mobile terminal may provide various functions. The present disclosure proposes a method for providing various functions using a plurality of cameras.

SUMMARY

An aspect of the detailed description is to provide various images through a plurality of cameras. In accordance with the purpose of this specification, as embodied and broadly described herein, a mobile terminal may include: a main body configured to include a front surface and a rear surface; a plurality of cameras disposed on the rear surface; a display unit configured to display a preview image of an image input through a first camera among the plurality of cameras; and a controller configured to, in response to a touch applied to an image object corresponding to a specific subject included in the preview image, select the image object corresponding to the specific subject, capture an image input through the first camera as a still image in response to reception of an image capture request for capturing an image in a state in which the image object corresponding to the specific subject is selected, and control a second camera different from the first camera, among the plurality of cameras, to capture an image including the selected specific subject as video, wherein the controller processes a region in which the image object corresponding to the specific subject by associating the region to a region including the image object corresponding to the specific subject in the captured video such that the region in which the image object corresponding to the specific subject is displayed in the captured still image is changed to video.

In an embodiment of the present disclosure, in a case in which the image object corresponding to the specific subject is in plurality, the controller may extract a plurality of regions including the plurality of image objects from the video, and synthesize the plurality of extracted regions with the still image to generate a synthetic image.

In an embodiment of the present disclosure, the controller may synthesize the plurality of extracted regions to the still image such that the synthetic image has different playback sections with respect to the plurality of regions including the plurality of image objects.

In an embodiment of the present disclosure, the controller may display a guide graphic object indicating an image object corresponding to the specific subject on the preview image.

In an embodiment of the present disclosure, in a state in which the guide graphic object indicating the image object corresponding to the specific subject is displayed, when a touch applied to the region in which the image object corresponding to the specific subject is displayed is sensed, the controller may control the second camera to capture video including the image object corresponding to the specific subject.

In an embodiment of the present disclosure, the still image may include a plurality of subjects, and the specific subject may be a subject whose movement is sensed among the plurality of subjects.

In an embodiment of the present disclosure, the controller may control the second camera such that a focus is set on the specific subject.

In an embodiment of the present disclosure, on the basis of a point in time at which the image capture request is input, the second camera may capture video during a preset period of time.

In an embodiment of the present disclosure, in a case in which the captured still image is displayed on the display unit, the controller may display a graphic object indicating that video is associated on a region in which the image object corresponding to the specific subject is displayed in an overlapping manner on the captured still image.

In an embodiment of the present disclosure, in a case in which the specific subject is in plurality, the still image processed in associated with the video may include a plurality of regions in which the image object corresponding to the plurality of specific subjects is displayed, and in a case in which the still image processed in association with the video is displayed on the display unit, the controller may play video associated with at least one of the plurality of regions.

In an embodiment of the present disclosure, in a case in which the still image is processed in association with at least a portion of video, the controller may display remaining regions other than the region including the image object corresponding to the specific subject as a still image in the still image.

In an embodiment of the present disclosure, a home screen page including a background image may be displayed on the display unit, and in a case in which the still image processed in association with the video is set as the background image, the controller may control the display unit such that a region in which the image object corresponding to the specific subject is displayed is moved.

In an embodiment of the present disclosure, in a case in which an event occurs in an application installed in the mobile terminal, the controller may associate the region in which the specific subject is displayed with the application such that the image object corresponding to the specific subject is moved in the still image set as the background image.

In an embodiment of the present disclosure, the controller may determine a speed at which the image object corresponding to the specific subject is moved on the basis of the number of occurrence of events of an application installed in the mobile terminal.

In an embodiment of the present disclosure, the controller may determine a speed at which the image object corresponding to the specific subject is moved in the still image set as the background image on the basis of remaining battery capacity of the mobile terminal.

Another embodiment includes a method for controlling a mobile terminal may include: displaying a preview image of an image input through a first camera among a plurality of cameras disposed on a rear surface of a mobile terminal; when a touch is applied to an image object corresponding to a specific subject included in the preview image, selecting the image object corresponding to the specific subject; in a state in which the image object corresponding to the specific subject is selected, when an image capture request for capturing an image is received, capturing an image input through the first camera as a still image and controlling a second camera different from the first camera among the plurality of cameras to capture the image including the selected specific subject as video; and processing a region in which the image object corresponding to the specific subject is displayed by associating the region to a region including the image object corresponding to the specific subject in the captured video such that a region in which the image object corresponding to the specific subject is displayed is changed to video in the captured still image.

In an embodiment of the present disclosure, in the processing the region in an associating manner, in a case in which the image object corresponding to the specific subject is in plurality, a plurality of regions including the plurality of image objects may be extracted from the video and the plurality of extracted regions may be synthesized with the still image to generate a synthetic image.

In an embodiment of the present disclosure, the synthetic image may have different playback sections with respect to the plurality of regions including the plurality of image objects.

In an embodiment of the present disclosure, in the preview image, a guide graphic object indicating the image object corresponding to the specific subject may be displayed on the region in which the image object corresponding to the specific subject is displayed in an overlapping manner.

In an embodiment of the present disclosure, in a state in which the guide graphic object indicating the image object corresponding to the specific subject is displayed, the image object corresponding to the specific subject may be selected when a touch is applied to the region in which the image object corresponding to the specific subject is displayed.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

Another embodiment relates to a mobile terminal that includes first and second cameras located on a rear side of the terminal. A controller is included that is configured to cause the display to display a first preview image of a first image received from the first camera, where the first preview image includes an image object corresponding to a specific subject. The controller further selects the image object in response to an input, captures the first image as a still image in response to an image capture request, controls the second camera to capture video that includes the specific subject, and causes the display to display a synthesized image comprising a first area and a second area, where the first area includes portions of the captured first image, and the second area corresponds to the specific subject included in the first image and includes a portion of the captured video.

Another embodiment involves a method for controlling a mobile terminal having a display and first and second cameras. Such method includes displaying, on the display, a first preview image of a first image received from the first camera, wherein the first preview image includes an image object corresponding to a specific subject; selecting the image object in response to an input; capturing the first image as a still image in response to an image capture request; controlling the second camera to capture video that includes the specific subject; and displaying, on the display, a synthesized image comprising a first area and a second area, wherein the first area comprises portions of the captured first image, and the second area corresponds to the specific subject included in the first image and comprises a portion of the captured video.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal in accordance with the present disclosure.

FIG. 2 is a flowchart illustrating a control method for generating a synthetic image by using a plurality of images input to two cameras disposed on the rear side of the mobile terminal according to an embodiment of the present disclosure.

FIGS. 3A(1), 3A(2), 3A(3), 3B(1), and 3B(2) illustrate a control method of FIG. 2.

FIGS. 4A(1), 4A(2), 4A(3), 4A(4), 4B(1), 4B(2), 4B(3), and 4B(4) illustrate a method for generating a synthetic image in which a dynamic region is changed in a still image according to the passage of time.

FIGS. 5A(1), 5A(2), 5A(3), 5B(1), 5B(2), and 5B(3) illustrate a method for selecting a portion to be associated with video in generating a synthetic image.

FIGS. 6A(1), 6A(2), 6A(3), 6A(4), 6B(1), 6B(2), 7A(1), 7A(2), 7A(3), 7B(1), 7B(2), and 7B(3) illustrate a method for setting a still image including a dynamic region as a home screen page.

FIGS. 8A(1), 8A(2), 8A(3), 8A(4), 8B(1), 8B(2), 8B(3), 9A(1), 9A(2), 9B(1), 9B(2), 10A(1), 10A(2), 10A(3), 10A4, 10B(1), 10B(2), 10B(3), and 10B(4) illustrate a method for reproducing (or playing) a still image including a dynamic region.

FIGS. 11A(1), 11A(2), 11A(3), 11B(1), 11B(2), 11B(3), 12A(1), 12A(2), 12A(3), 12B(1), 12B(2), 12B(3), 12C(1), and 12C(2) illustrate a method for controlling a plurality of cameras in a case in which the plurality of cameras disposed on a rear surface of a mobile terminal have different angles of view.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
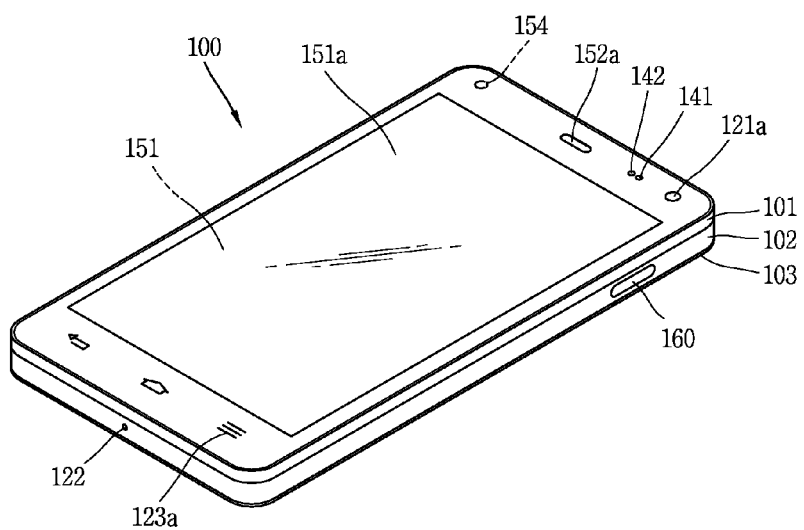
FIGS. 1B and 1C depict one example of a mobile terminal, viewed from different directions.
Figure 1C:
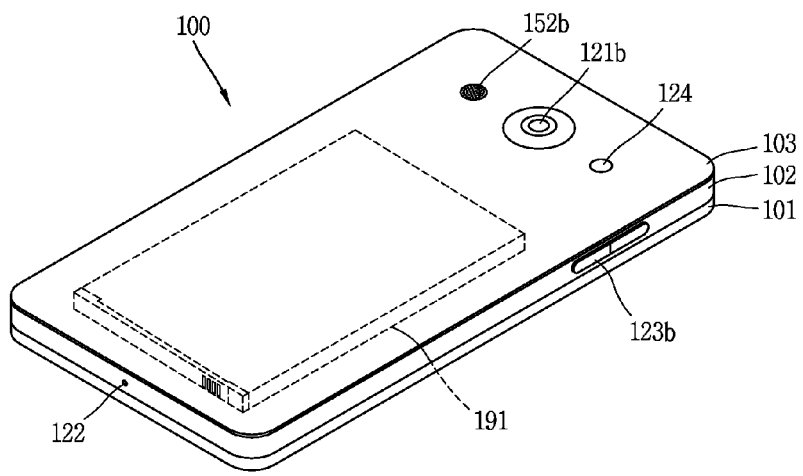

Reference is now made to FIGS. 1A-1C, where FIG. 1A is a block diagram of a mobile terminal in accordance with the present disclosure, and FIGS. 1B and 1C depict one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170.

The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
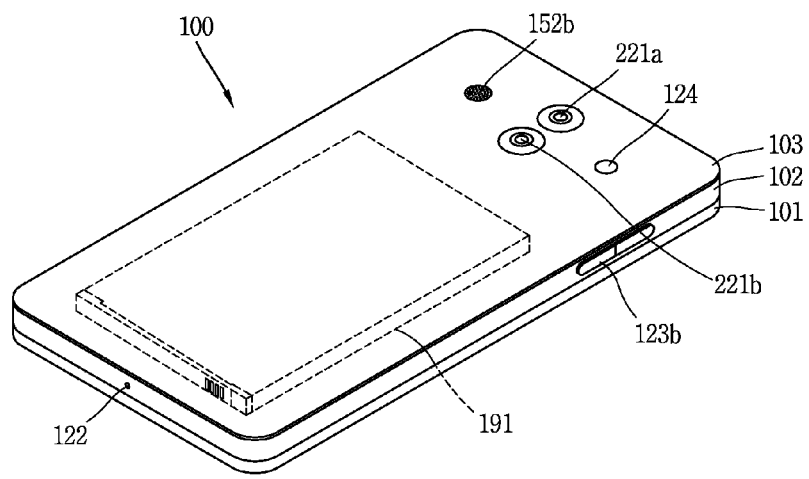
FIG. 1D is a view illustrating a rear side of a mobile terminal according to an embodiment of the present disclosure.
Figure 1E:
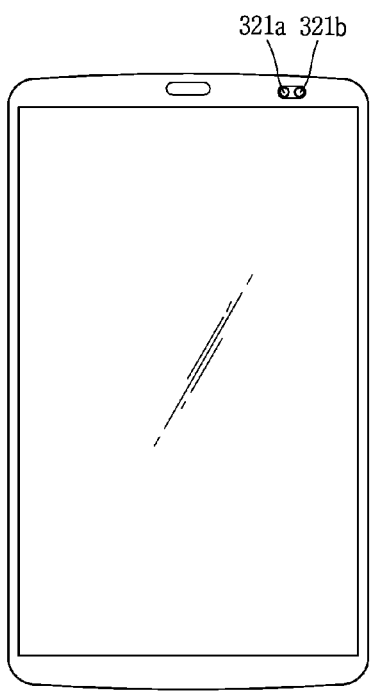
FIG. 1E is a view illustrating a front side of a mobile terminal according to an embodiment of the present disclosure.

FIG. 1D is a view illustrating a rear side of a mobile terminal according to an embodiment of the present disclosure, and FIG. 1E is a view illustrating a front side of a mobile terminal according to an embodiment of the present disclosure.

At least two cameras may be disposed on a rear surface of the mobile terminal according to an embodiment of the present disclosure. The at least two cameras may have the same angle of view or different angles of view. The angle of view is an image capture range of a lens installed in the cameras. Here, as an angle of view is greater, an image of a larger range may be captured.

As the angle of view of the lens of the camera is greater, a focal length may be shortened. Thus, in a case in which an image is captured with a camera having a lens with a larger angle of view, an image of a large range may be captured. Here, however, due to the larger angle of view, the captured image of a large range may be distorted as much and perspective thereof may be exaggerated.

The lens may be classified as a wide angle lens, a normal lens, and a telephoto lens depending on the angles of view. The normal lens has an angle of view of 45 degrees (approximately, 40 to 50 degrees) and a focal length of 50 mm. With respect to the normal lens, a lens having an angle of view greater than 45 degrees may be classified as a wide angle lens, and a lens having an angle of view smaller than 45 degrees may be classified as a telephoto lens.

The mobile terminal may include at least two cameras disposed on at least one of a front surface, a side surface, and a rear surface of the main body thereof in order to capture images at different angles of view. For example, as illustrated in FIG. 1D, two cameras 221a and 221b having different angles of view may be disposed to be adjacent to each other on the rear surface of the main body.

In an embodiment of the present disclosure, two cameras having different angles of view may be disposed on the front surface or on the side surface of the main body of the mobile terminal, as well as on the rear surface thereof. For example, as illustrated in FIG. 1E, in the mobile terminal, two cameras 321a and 321b having different angles of view may be disposed to be adjacent to each other on the front surface of the main body.

Also, in the mobile terminal, at least two cameras may be disposed on different surfaces of the front surface, the side surface, and the rear surface to have different image capture directions.

Meanwhile, in the above description, the case in which two cameras are provided will be described, but the present disclosure may also be applied in the same manner to a case in which a single camera has a plurality of lenses. That is, the present disclosure may also be applied in the same manner to an array camera including a plurality of lenses along a plurality of lines.

Hereinafter, a case in which two cameras are disposed on the rear surface of the mobile terminal will be described, but the present disclosure may also be applied to a plurality of cameras and a single camera having a plurality of lenses, in the same manner or in a similar manner.

Also, in the following description, the two cameras disposed on the rear surface of the main body of the mobile terminal will be referred to as a first camera 221a and a second camera 221b. However, a function applied to both of the first camera 221a and the second camera 221b will be described as a term of a camera.

Hereinafter, embodiments related to a control method that may be implemented in the mobile terminal configured as described above will be described with reference to the accompanying drawings. It will be apparent to those skilled in the art that modifications and variations can be made without departing from the spirit and scope of the invention.

In the following descriptions, drawings will be described in a clockwise direction or in a downward direction on the basis of the left upper drawing, Hereinafter, a control method for generating a synthetic image by using a plurality of images input to two cameras disposed on a rear surface of the mobile terminal according to an embodiment of the present disclosure will be described.

FIG. 2 is a flowchart illustrating a control method for generating a synthetic image by using a plurality of images input to two cameras disposed on the rear side of the mobile terminal according to an embodiment of the present disclosure. FIGS. 3A(1), 3A(2), 3A(3), 3B(1), and 3B(2) illustrate a control method of FIG. 2.

The mobile terminal according to an embodiment of the present disclosure may display a preview image of an image input through a first camera among a plurality of cameras disposed on the rear surface or side of the mobile terminal, on the display unit in step S210. Note that embodiments will be presented herein where a particular element (e.g., a camera) will be described as being located on a particular surface of the mobile terminal, for example. However, such teachings can be similarly applied to situations where the element is on a particular side (not surface) of the terminal.

As illustrated in FIG. 1D, the mobile terminal may have a plurality of cameras on the rear surface of the main body. For example, the mobile terminal may have a first camera 221a and a second camera 221b on the rear surface thereof. Hereinafter, the case in which the first camera 221a or the second camera 221b are provided will be described.

The mobile terminal according to an embodiment of the present disclosure may capture a still image and video simultaneously and generate a synthetic image (also referred to herein as a synthesized image) by replacing one region of the still image with the captured video.

In order to generate the synthetic image, the control unit 180 may receive at least one image from at least one of the first camera 221a or the second camera 221b.

The image may be at least one of a still image or video. In order to receive images from the cameras, the controller 180 may execute an image capture function. The image capture function refers to a function of activating a camera, receiving an image from the camera, and displaying an image frame received from the camera on the display unit 151 or storing it in the memory 170.

Here, activation of the camera may refer to a state in which the camera is available to receive an image corresponding to a subject. Conversely, deactivation of the camera may refer to a state in which the camera cannot receive an image corresponding to a subject. Also, when the image capture function is executed, the controller 180 may individually control whether to activate the first camera 221a and the second camera 221b on the basis of a control command (or other input) of the user.

For example, when a user's control command for activating any one camera is received, the controller 180 may activate any one of the first camera 221a or the second camera 221b to receive an image corresponding to a subject from activated camera. Alternatively, when a user's control command for activating the first camera 221a and the second camera 221b is received, the controller 180 may activate both the first camera 221a and the second camera 221b together and receive images corresponding to a subject from the first camera 221a and the second camera 221b simultaneously.

The controller 180 may display preview images of the images received from the first camera 221a and the second camera 221b on the display unit 151. The preview image may refer to an image frame received from the camera displayed on the display unit 151 before an image is captured. That is, the preview image may be an image previously provided to the user before the image is captured.

The controller 180 may receive a preview image of an image from at least one of the first camera 221a or the second camera 221b and display this preview image on the display unit 151. For example, as illustrated in FIG. 3A(1), the controller 180 may display a preview image of an image received from the first camera 221a on the display unit 151. Alternatively the controller 180 may display a preview image of a first image received from the first camera 221a and a preview image of a second image received from the second camera 221b together on the display unit 151.

The preview image may include image objects corresponding to a subject. When the subject is moving, the image objects corresponding to the subject may be displayed in a position corresponding to the movement of the subject within the preview image.

In a state in which a preview image of an image received from any one of the first camera 221a or the second camera 221b is displayed on the display unit 151, the controller 180 may detect a specific image object corresponding to a specific subject included in the preview image. The specific subject may be an object of a target of the image capturing and may include a thing (or an object, an article, goods, a product, a matter) and a person.

There may be multiple specific objects, in which case the controller 180 may detect all of the plurality of subjects. For example, as illustrated in FIG. 3A(1), the controller 180 may detect a first image object 310a, a second image object 310b, and a third image object 310c from the preview image.

Also, the controller 180 may detect whether the specific subject has moved from a previous location using the image received from the camera. An example of an object that has moved is where the specific has changed posture or position.

When a movement of the specific subject among a plurality of subjects included in the preview image is detected, the controller 180 may display a guide graphic object, or other information, indicating the specific subject on the preview image so that the user may identify that the specific subject has moved. The guide graphic object may be a graphic object indicating the subject that is moved.

The guide object or other information may be displayed in a region in which an image object corresponding to the specific subject is displayed in an overlapping manner. In this case, the guide graphic object may have transparency when displayed such that the image object corresponding to the specific subject is not visually obscured.

For example, as illustrated in FIG. 3A(1), in a case in which movement of a first image object 310a, a second image object 310b, and a third image object 310c is detected, the controller 180 may display a guide graphic object in the form of a dotted line in the region in which the first image object 310a, the second image object 310b, and the third image object 310c are displayed in an overlapping manner. Thus, the user may obtain information regarding the moving subject from the current preview image. No guide graphic object is typically displayed when there is no detected movement.

Some embodiments detect a specific subject by the controller 180, or a specific subject may be detected according to touch applied to the preview image. For example, the user may apply a touch to select an image object corresponding to a specific subject in the preview image. In this case, the controller 180 may detect a specific subject on the basis of the touch.

When the preview image is displayed and the specific subject included in the preview image satisfies a preset condition, may capture an image input through the first camera 221a as a still image and an image input through the second camera 221b as video in shown in block S220 of FIG. 2.

The controller 180 may independently control the first camera 221a and the second camera 221b. For instance, the controller 180 may capture (obtain, generate, or process) images input through the first camera 221a and the second camera 221b as a still image or video. Capturing (or obtaining or generating) the images may be an operation of capturing an image input from the camera 221 as a still image or video and storing the captured still image or video in the memory 170. For example, the controller 180 may capture a still image through the first camera 221a and capture video through the second camera 221b. Thus, in an embodiment of the present disclosure, a still image and video may be simultaneously obtained. When there is detected movement of the specific subject included in the preview image from one camera (either camera 221a or 221b), the controller 180 may display a guide graphic object on the preview image indicating the specific subject whose movement has been detected. When one subject among the plurality of subjects of the preview image is selected, the controller 180 may capture video including the selected subject through the other camera (the other of camera 221a or 221b).

For example, as illustrated in FIG. 3A(1), in response to a touch applied to the third image object 310c, the controller 180 may select a specific subject corresponding to the third image object 310c. In another example, although not shown, in response to touches sequentially applied to the first image object 310a and the third image object 310c, the controller 180 may simultaneously select the first image object 310a and the third image object 310c.

When at least one subject is selected and an image capture request is received, the controller 180 may control the first camera 221a and the second camera 221b to capture an image input from the first camera 221a as a still image and an image input from the second camera 221b as video. In this scenario, the controller 180 may capture the video input from the second camera 221b together in response to an image capture request with respect to the first camera 221a.

The operation of the mobile terminal for controlling the first camera 221a and the second camera 221b may refer to an operation of activating the first camera 221a and the second camera 221b to allow images to be input through the first camera 221a and the second camera 221b and capturing images input through the first camera 221a and the second camera 221b according to the image capture request. The image capture request, as a control command for capturing an image through the camera 121, may be input to the mobile terminal in various manners. For example, the image capture request may be input to the mobile terminal when the user presses or touches a hardware key provided in the mobile terminal or touches a software key or a visual key output on the display unit 151.

For example, as illustrated in FIG. 3A(2), when a touch is applied to the graphic object 330, the controller 180 may receive the image capture request. When this request is received, the controller 180 may control the first camera 221a and the second camera 221b to capture a still image and video, respectively. For example, as illustrated in FIG. 3A(1), when the image capture request is received, the controller 180 may capture a still image through the first camera 221a and capture video through the second camera 221b. Thus, the user may capture video through the second camera 221b without a separate control command with respect to video capturing. Also, even while a preview image of an image input from the second camera 221b is not displayed on the display unit 151, the user may capture video through a control command with respect to the first camera 221a.

The controller 180 may also control the second camera 221b such that the specific subject corresponding to the selected image object is included in the video captured through the second camera 221b. For example, the controller 180 may control the second camera 221b to capture video in which a specific subject corresponding to the selected image object 310c of the second camera 221b is focused. In another example, when a plurality of image objects are selected, the controller 180 may capture video to include all the plurality of selected image objects through the second camera 221b. In another example, the controller 180 may control the second camera 221b to capture video by optically zooming-in or zooming-out on the basis of the specific subject corresponding to the selected image object 310c.

The controller 180 may also capture video during a preset time interval through the second camera 221b. The preset time interval may be a time interval set by the user or may be a time interval previously set in the mobile terminal.

The preset time interval may include a previous or subsequent time interval based on the point in time at which the image capture request is received. For example, the preset time interval may be an interval for 10 seconds from the point in time at which the image capture request is received. In another example, the preset time interval may be a time interval for five seconds before the image capture request is received or after the image capture request is received. In another example, the preset time interval may be an interval for 10 seconds before the image capture request is received.

When the still image or video is captured, the mobile terminal according to an embodiment of the present disclosure may process a region including the image object corresponding to the specific subject in the still image captured through the first camera 221a by associating it with at least a portion of the video captured through the second camera 221b, such as that shown in block S230 of FIG. 2.

When the still image and the video are captured, the controller 180 may display the captured still image or video on the display unit 151. For example, as illustrated in FIG. 3A(3), when an image is captured in response to the received image capture request, the controller 180 may display the still image 300 on the display unit 151.

In addition, when images are captured through the first camera 221a and the second camera 221b, the controller 180 may process the separately captured still image and video in an associating manner. For instance, the controller 180 may synthesize a region including an image object corresponding to a specific subject in the still image captured through the first camera 221a with a portion (e.g., some or all) of the video captured through the second camera 221b to generate a synthetic image (referred to also as a synthesized image).

The synthesized image may be an image in which a portion of the still image is moves. For example, synthesized image may include both a region which does not move (an image) and a region which moves (video). The synthesized image may also be referred to as "still image including a dynamic region", a "cinemagraph image", a "cinematograph image", or a "motion picture."

As used herein, in a synthesized image, a region which does not move will sometimes be referred to as static region and the region which moves will sometimes be referred to as a dynamic region.

In order to generate the synthesized image, the controller 180 may detect a region in which the image object corresponding to the specific subject is included from the video captured through the second camera 221b. The controller 180 may then change the region including the image object corresponding to the specific object in the still image to the region including the image object corresponding to the specific subject detected from the video.

In this manner, the controller 180 may generate the synthesized image in which only the image object corresponding to the specific subject is displayed as video in the still image. That is, the region in which the image object corresponding to the specific subject is displayed may be a dynamic region, and the other regions may be static regions. Thus, the other regions may be a still image.

For example, as illustrated in FIGS. 3B(1) and 3B(2), the controller 180 may generate a synthesized image in which only the image object 320 corresponding to the specific subject moves, in the still image 300. In this manner, the user may obtain a cinemagraph image in which only a portion of the still image moves.

The foregoing describes the scenario in which one specific subject has been selected, but alternatively multiple subject selection is possible. In this embodiment, the controller 180 may generate a synthesized image in which the plurality of specific subjects are moving.

In addition, the controller 180 may change a dynamic region in the still image over time. For example, the controller 180 may cause a first image object to be displayed as moving in a first time interval and then display a second image object as moving in a second time interval. Thus, the user may be provided with a static image in which the moving image object is changed over time.

The controller 180 may also execute an additional function using the dynamic region. For instance, the controller 180 may link the dynamic region to a specific application installed in the mobile terminal. In this feature, the controller 180 may execute a function related to the linked application through the dynamic region.

The above describes a method for simultaneously capturing a still image and video through the plurality of cameras disposed on the rear surface of the mobile terminal and generating a synthesized image using the simultaneously captured still image and the video. By simultaneously capturing a still image and video through the plurality of cameras a portion of the still image may be changed with video conveniently to generate a synthesized image. Thus, the user may obtain the cinemagraph image without going through a complicated procedure.

Also, by capturing the portion which moves and the portion which does not move by separate cameras, precision of the cinemagraph may be enhanced. In addition, before capturing an image, the user may set a portion which moves in a still image, whereby a cleaner cinemagraph image may be obtained.

A method for generating a synthesized image described above in various forms will now be described. For instance, a method for generating a synthesized image in which a dynamic region is changed over time from a still image will be described. In this regard, FIGS. 4A(1), 4A(2), 4A(3), 4A(4), 4B(1), 4B(2), 4B(3), and 4B(4) illustrate a method for generating a synthetic image in which a dynamic region is changed in a still image according to the passage of time.

The still image may include at least one dynamic region. When the still image includes a plurality of dynamic regions, the controller 180 may individually control the plurality of dynamic regions. For example, the controller 180 may set a playback section of the plurality of dynamic regions to be different. That is, the controller 180 may generate a synthesized image in which one region of the still image changed to video is changed over time.

In order to generate a still image having a plurality of dynamic regions having different playback sections, the controller 180 may select a playback section with respect to each of the plurality of dynamic regions according to user selection. For example, as illustrated in FIG. 4A(1), when a preview image input from the first camera 221a is displayed on the display unit 151 and an image capture request is received, the controller 180 may capture a still image through the first camera 221a and capture video through the second camera 221b.

While video is being captured through the second camera 221b, the controller 180 may sense a first touch applied to a region of any one image object, among a plurality of image objects included in the preview image. In this case, the controller 180 may set a point in time at which the first touch is applied as a start point at which the one image object is played.

For example, as illustrated in FIG. 4A(2), while video is being captured through the second camera 221b, when a first touch is applied to a region in which the third image object 310c is displayed, the controller 180 may set a point in time at which the first touch is applied as a start point at which playing of the third image object 310c is started.

After the start point for playing the image object is set, the controller 180 may sense a second touch applied to a region in which another image object included in the preview image is displayed. In this case, the controller 180 may set a point in time at which the second touch is applied as a point in time at which playing of the one image object is terminated and as a point in time at which playing of another image object is started. That is, in the still image, a time point at which a first touch has been applied to a time point at which a second touch is applied may be set as a playback section of the third image object 310c.

For example, as illustrated in FIG. 4A(3), after a start point for playing the third image object 310c is set, when the second touch is applied to the first image object 310a, the controller 180 may set a point in time at which the second touch is applied as a point in time at which playing of the third image object 310c is terminated and a point in time at which playing of the first image object 310a is started.

After the point in time at which playing of the other image object is to be started is set, when video is captured for a preset period of time, the controller 180 may stop capturing of the video. The preset period of time may be set in advance in the mobile terminal or may be set by the user in advance. For example, the preset period of time may be a time of 10 seconds, or any other time, from a point in time at which the image capture request is received.

In a case in which capturing of the video is stopped, the controller 180 may set the point in time at which the capturing of the video is stopped as a point in time at which playing of the other image object is terminated.

Thus, in an embodiment of the present disclosure, a still image in which the playback section of the third image object 310c and the playback section of the first image object 310a are different may be generated. That is, playback sections of the plurality of dynamic regions included in the still image may be set to be different.

In a case in which a user's playback request with respect to the still image the controller 180 may play (also referred to as reproduce) the dynamic region in the still image. The playing of the dynamic region may include to outputting video synthesized in the dynamic region on the display unit 151. The controller 180 may repeat the playback section infinitely or a preset number of times.

In the case in which the still image has a plurality of dynamic regions, the controller 180 may play a dynamic region of at least some of the plurality of dynamic regions.

In the case in which the plurality of dynamic regions have different playback sections, the controller 180 may play video in mutually different playback sections. For example, as illustrated in FIGS. 4B(1), 4B(2), in a case in which a still image is displayed, the controller 180 may play a first dynamic region 410 including the third image object 310*c* in the first playback section. In this case, a second dynamic region 420 may be displayed as a still image, without being played.

Also, as illustrated in FIGS. 4B(3), 4B(4), the controller 180 may play the second dynamic region 420 including the first image object 310*a* in a second playback section. In this case, playing of the first dynamic region 410 may be stopped. Thus, the user may obtain the still image in which the dynamic region is changed over time.

The foregoing describes a method for generating a still image in which a dynamic region is changed so that the user may obtain cinemagraph images in various forms. A method for selecting a portion to be associated with video in generating a synthesized image will now be described.

FIGS. 5A(1), 5A(2), 5A(3), 5B(1), 5B(2), and 5B(3) illustrate a method for selecting a portion to be associated with video in generating a synthetic image. As shown in these figures, the mobile terminal according to an embodiment may simultaneously capture a still image and video through separate cameras and generate a synthesized image by using the captured images.

The synthesized image may be an image including a dynamic region in which at least a portion of the still image is moving. The dynamic region may be set on the basis of a user selection. The dynamic region may be selected by the user before the still image and video are captured, or may be selected by the user after the still image and the video are captured.

For example, as illustrated in FIG. 5A(1), the controller 180 may display a preview image of an image input from the first camera 221*a* on the display unit 151. In the preview image, a guide graphic object indicating an image object corresponding to the moving subject may also be displayed.

Before the image capture request is received, when a touch is applied to the region in which the image object corresponding to a specific subject is displayed in the preview image, the controller 180 may select the region in which the image object corresponding to the specific subject is displayed, as a dynamic region. For example, as illustrated in FIG. 5A(2), before an image capture request is received, when a touch is applied to a region in which an image object corresponding to the third image object 310*c* is displayed, the controller 180 may set the region in which the third image object 310*c* is displayed as a dynamic region. Transparency or color of the region in which the third image object 310*c* is displayed may be changed to indicate that the region in which the third image object 310*c* is displayed has been selected as a dynamic region.

When the third image object 310*c* is selected and a touch is applied to the region in which the third image object 310*c* is displayed, the controller 180 may release selection of the region in which the third image object 310*c* is displayed. In this case, the controller 180 may not set the region in which the third image object 310*c* is displayed as a dynamic region. For example, as illustrated in FIG. 5A(3), when the third image object 310*c* is selected, when a touch is applied again, the controller 180 may release selection of the region in which the third image object 310*c* is displayed. In this case, the region in which the third image object 310*c* is displayed may be changed to the original color or transparency.

The controller 180 may also select a plurality of dynamic regions in the preview image. For example, as illustrated in FIGS. 5B(1), 5B(2), when touches are applied to the regions in which the third image object 310*c* and the first image object 310*a* are displayed, the controller 180 may set these regions as dynamic regions. In this case, as illustrated in FIG. 5B(3), transparency or color of the region in which the third image object 310*c* is displayed and the region in which the first image object 310*a* is displayed may be changed.

After the dynamic region is set, when an image capture request is received, the controller 180 may capture a preview image of an image input from the first camera 221*a* as a still image and capture an image input from the second camera 221*b* as video. The controller 180 may then extract a region set as a dynamic region from the video captured through the second camera 221*b*. For example, the controller 180 may extract the region including the first image object 310*a* and the region including the third image object 310*c* from the video.

The controller 180 may generate a synthesized image by associating the extracted dynamic regions in the image captured through the first camera 221*a*. The synthesized image may be a synthesized image including two dynamic images.

A method has been described for selecting a dynamic region before a still image and video are captured, but such selection may alternative be selected after the still image and video are captured. For example, when a still image and video are simultaneously captured, the controller 180 may display a guide graphic object with respect to at least one image object in which movement of a subject has been sensed among a plurality of image objects included in the still image.

The controller 180 may then set the region in which the touch-applied image object, among at least one image object in which the guide graphic object is displayed, as a dynamic region. Then the controller 180 extracts at least a portion of the video of the touch-applied image object in the video captured together with the still image and associate it with the still image to generate a synthesized image. This is a method for selecting a dynamic image from the still image, wherein the user may select a moving portion from the still image in advance and capture the still image.

Next described is setting a still image including a dynamic region as a home screen page. FIGS. 6A(1), 6A(2), 6A(3), 6A(4), 6B(1), 6B(2), 7A(1), 7A(2), 7A(3), 7B(1), 7B(2), and 7B(3) illustrate a method for setting a still image including a dynamic region as a home screen page.

A home screen page is a screen representing an idle state of the mobile terminal. The home screen page may also be referred to as an idle screen, a menu screen, or a background screen. The home screen page may include a background image, an icon, or a widget. The background image is an image of a background of the home screen page. The background image may be set by using an image stored in the mobile terminal or an image downloaded from the Web. An icon is a graphic object for executing an application installed in the mobile terminal. A widget is an application program providing an execution screen of an application.

The background image may be set by the user or at the factory during manufacture. For example, as illustrated in FIG. 6A(1), when a control command for setting a specific image as a background image is received, the controller 180 may set the specific image as a background image.

When a still image including a plurality of dynamic regions is set as a home screen page, the controller 180 may select at least one of the plurality of dynamic regions as a dynamic region to be played on the home screen page on the basis of a user selection. For example, as illustrated in FIG. 6A(1), when a still image including first, second, and third dynamic regions 610a, 610b, and 610c is set as a home screen page, the controller 180 may display a still image in which a guide image (dotted line) indicating the three dynamic regions 610a, 610b, and 610c is displayed on the display unit 151 in order to select at least one dynamic region to be played on the home screen page among the three dynamic regions 610a, 610b, and 610c.

In FIGS. 6A(3), 6A(4), when a touch is applied to the second dynamic region 610b and the third dynamic region 610c, the controller 180 may select these regions to be played in the home screen page. When selection of the region to be played in the home screen page is completed, the controller 180 may play the second dynamic region 610b and the third dynamic region 610c.

As illustrated in FIGS. 6B(1), 6B(2), the controller 180 may play the second dynamic region 610b and the third dynamic region 610c in the home screen page. Thus, the user may view an image in which a portion is moving in the home screen page.

The controller 180 may associate a dynamic region included in a still image with an application installed in the mobile terminal or state information of the mobile terminal. In particular, the controller 180 may control playing of the dynamic region on the basis of an application installed in the mobile terminal or state information of the mobile terminal. Controlling of playing of the dynamic region refers to controlling the start of playing of the dynamic region, terminating of the playing of the dynamic region, a speed (or a rate) for playing the dynamic region, or a change in a color of the dynamic region.

When notification information is generated in an associated application, the controller 180 may control playing of the dynamic region. For example, the controller 180 may associate a message application and the dynamic region on the basis of a user selection. The message application is an application program for transmitting and receiving a message to and from an external terminal. In this case, the controller 180 may play the dynamic region in response to reception of a message from the external terminal.

For example, as illustrated in FIG. 7A(1), when a message is received from the external terminal, the controller 180 may play the dynamic region 610c associated with the message application and display notification information 710 indicating that a message has been received in one region of the home screen page.

Although not shown, the controller 180 may change a play speed (or a play rate) according to the number of messages received from the external terminal. For example, as the number of messages received from the external terminal is increases, the controller 180 may change the play speed of the dynamic region.

In another example, the controller 180 may associate the dynamic region with execution of a specific application. That is, when a touch is applied to the dynamic region, the controller 180 may execute an application associated with the dynamic region.

The specific application associated with the dynamic region may be an application selected by the user among applications installed in the mobile terminal. Alternatively, the specific application associated with the dynamic region may be an application hidden by the user in the mobile terminal. A hidden application may be an application such that an icon of the application is not shown on a home screen page or a menu screen. Alternatively, the specific application associated with the dynamic region may be a privacy application related to personal information. Thus, for security of an application or when an icon of an application is set not to be shown, the user may easily access the application using the dynamic region.

For example, when a personal information management application is associated with a dynamic region, the controller 180 may execute the personal information management application in response to a touch applied to the dynamic region. Alternatively, in the case in which state information of the mobile terminal corresponds to a preset condition, the controller 180 may control playing of the dynamic region. For example, on the basis of a user selection, the controller 180 may associate information regarding remaining battery capacity of the mobile terminal with a dynamic region. In this case, the controller 180 may change a play speed of the dynamic region according to the information regarding remaining battery capacity.

As illustrated in FIGS. 7B(1), 7B(2), when remaining battery capacity is 15%, the controller 180 may play the dynamic region 610a associated with the information regarding remaining battery capacity at a first play speed. As shown in FIG. 7B(3), when the remaining battery capacity is 5%, the controller 180 may play the dynamic region 610a at a second play speed slower than the first play speed. Thus, the user may recognize information regarding the remaining battery capacity by viewing the play speed of the dynamic region.

With respect to a plurality of dynamic regions, the controller 180 may associate them with different applications or state information of the mobile terminal. That is, through playing of each of the dynamic regions, the user may recognize a state of an application associated with a dynamic region or may recognize a state of the mobile terminal.

For example, as illustrated in FIGS. 7A(1), 7A(2), 7A(3), 7B(1), 7B(2), and 7B(3) the controller 180 may associate a message application with the third dynamic region 610c and associate information regarding remaining battery capacity of the mobile terminal to the first dynamic region 610a. Thus, through the dynamic region moved in the static image, the user may recognize a state of an application of the mobile terminal.

A control method has been described where a still image including a dynamic region is set as a background image of a home screen page. The user may recognize state information of the mobile terminal or state information of an application installed in the mobile terminal by using movement information of a dynamic region.

A method for playing a still image including a dynamic region will now be described. FIGS. 8A(1), 8A(2), 8A(3), 8A(4), 8B(1), 8B(2), 8B(3), 9A(1), 9A(2), 9B(1), 9B(2), 10A(1), 10A(2), 10A(3), 10A4, 10B(1), 10B(2), 10B(3), and 10B(4) illustrate a method for reproducing (or playing) a still image including a dynamic region.

First described will be the controller 180 displaying a still image including a plurality of dynamic regions on the display unit 151 through a gallery application. A gallery application is an application program providing a function of outputting a plurality of images stored in the memory 170 of the mobile terminal or a plurality of images stored in a Web server. The gallery application may also be referred to as a "photo application", a "photo view application", a "gallery", or "photograph".

When an icon associated with the gallery application is selected, the gallery application may be executed. When the gallery application is executed, the controller 180 may display thumbnail images of some of a plurality of images stored in the memory 170 of the mobile terminal or some of a plurality of images stored in a Web server on the display unit 151. The thumbnail images may be preview images compressed in size. For example, as illustrated in FIG. 8A(1), the controller 180 may display at least one thumbnail image corresponding to at least one image on the display unit 151.

When a control command for displaying a still image including a plurality of dynamic regions on the display unit 151 is received, the controller 180 may display a still image in which a plurality of dynamic regions are all played on the display unit 151, or may display a still image in which only one of a plurality of dynamic regions is played on the display unit 151, or may display a still image in which none of the plurality of dynamic regions is played on the display unit 151.

When the still image in which none of the plurality of dynamic regions is played is displayed, the controller 180 may display notification information indicating that a plurality of dynamic regions are present on the still image. For example, as illustrated FIG. 8A(1), in a state in which a plurality of thumbnail images respectively corresponding to the plurality of images are displayed on the display unit 151, the controller 180 may sense that a touch is applied to a region in which a thumbnail image 810 is displayed. In this case, the controller 180 may display an image 820 corresponding to the any one thumbnail image 810 on the display unit 151.

As illustrated in FIG. 8A(2), the image 820 corresponding to the thumbnail image 810 is a still image including dynamic regions, the controller 180 may display notification information 830 indicating that the plurality of dynamic regions are present on the still image 820 in an overlapping manner.

When a touch is applied to the notification information 830, the controller 180 may display guide information indicating the plurality of dynamic regions. For example, as illustrated in FIG. 8A(3), when a touch is applied to the notification information 830, the controller 180 may display guide information in the form of a dotted line on the region in which a first dynamic region 840a and a second dynamic region 840b are displayed.

When a touch is applied to at least one of the plurality of dynamic regions, the controller 180 may play the selected region. For example, as illustrated in FIGS. 8A(3), 8A(4), when a touch is applied to the first dynamic region 840a, the controller may play the first dynamic region 840a. Thus, the user may individually control playing of each of the dynamic regions in the still image including the plurality of dynamic regions.

Alternatively, as illustrated in FIGS. 8B(1), 8B(2), 8B(3), when the still image 820 including the plurality of dynamic regions 840a and 840b is displayed on the display unit 151, the controller 180 may automatically play the plurality of dynamic regions 840a and 840b. The controller 180 may play a dynamic region on a thumbnail image of a still image including a dynamic region. Also, the thumbnail image of the still image including the dynamic region may be set to have a size different from that of a thumbnail image of a still image not including a dynamic region.

For example, as illustrated in FIGS. 9A(1), 9A(2), a thumbnail image 910 of a still image including a moving dynamic region may be displayed on the display unit 151. Alternatively, the controller 180 may not play a dynamic region on the thumbnail image. For example, as illustrated in FIG. 9B(1), a thumbnail image 910 of a still image including a dynamic region may be an image in which the dynamic image is not moving. In this case, the thumbnail image 910 may be displayed as a compressed image of a specific image of video associated with the dynamic image. The specific still image may be a still image positioned at the beginning of the video. This specific still image is also referred to a s representative image.

When a touch is applied to the thumbnail image of the still image, the controller 180 may display the still image including the dynamic region on the display unit 151. In this case, as illustrated in FIG. 9B(2), the controller 180 may play the dynamic region of the still image including the dynamic region. A screen in which the dynamic region is played will also be referred to as a clean view. Alternatively, a screen in which the dynamic region of the still image including the dynamic region is played, rather than being played, may be termed a normal view.

Meanwhile, as illustrated in FIG. 9B(3), in a case in which the still image including the dynamic region is displayed as a clean view, the controller 180 may display a graphic object 920 associated with a temporary stop function together in one region of the display unit 151. The temporary stop function is a function for temporarily stopping video associated with the dynamic region.

When a touch is applied to the region in which the graphic object 920, the controller 180 may temporarily stop playing of the video associated with the dynamic region. When the temporary stop function is executed, when a touch is applied to the graphic object 920, the controller 180 may play the dynamic region again.

Alternatively, as illustrated in FIG. 10A(1), in a clean view state of a still image 1000 including the dynamic region, the controller 180 may display a graphic object 1010 for displaying the still image. In this case, as illustrated in FIGS. 10A(2), 10A(3), when a touch is applied to the graphic object 1010 the controller 180 may switch the still image 1000 including the dynamic image into a normal view state. In this case, the dynamic region of the still image 1000 including the dynamic region may not be played. Thus, the user may view the still image in which the dynamic region is not played.

As illustrated in FIG. 10A(4), when a touch applied to a graphic object 1010, the controller 180 may switch the still image 1000 including the dynamic region into the clean view state again.

Alternatively, in the clean view state of the still image 1000 including the dynamic region, when a preset type of touch is applied to the still image 1000, the controller 180 may switch the clean view state into a normal view state. For example, as illustrated FIGS. 10B(1), 10B(2), in the clean view state of the still image 1000, when double touches are applied to the still image 1000, the controller 180 may switch the clean view state into the normal view state.

In this case, as illustrated in FIGS. 10B(2), 10B(3), when the double touches are applied to the still image 1000, the controller 180 may switch the still image 1000 including the dynamic region into the normal view state. In this case, the dynamic region of the still image 1000 including the dynamic region may not be played. Thus, the user may view the still image in which the dynamic region is not played.

As illustrated in FIG. 10B(4), when double touches are not sensed any longer in the still image in which the dynamic region is not played, the controller 180 may switch the still image 1000 including the dynamic region into the clean view state again.

As a further alternative, when an editing mode is executed on the still image including the dynamic region, the controller 180 may select a specific still image of video associated with the dynamic region to generate a new still image. That is, the controller 180 may generate a still image not including a dynamic region.

The new still image may be associated with the still image including the dynamic region. When the new still image is associated with the still image, notification information indicating this association is included in one region of the new still image. When a touch applied to the notification information is sensed, the controller 180 may display the still image including the dynamic region, and when a touch applied to the notification information is not sensed, the controller 180 may display the new still image.

A method has been described for providing a still image including a dynamic region through the gallery application. Next described is a method for controlling a plurality of cameras disposed on the rear surface of the mobile terminal when the plurality of cameras have different angles of view. For example, among the plurality of cameras, a first camera may be a general camera, and a second camera may be a wide angle camera. In this regard, FIGS. 11A(1), 11A(2), 11A(3), 11B(1), 11B(2), 11B(3), 12A(1), 12A(2), 12A(3), 12B(1), 12B(2), 12B(3), 12C(1), and 12C(2) illustrate a method for controlling a plurality of cameras in a case in which the plurality of cameras disposed on a rear surface of a mobile terminal have different angles of view.

Embodiments will be described where a first camera 221a has a general angle and a second camera 221b has a wide angle, but such teaching can be similarly applied to implement three or more cameras. The controller 180 of the mobile terminal having the first camera 221a and the second camera 221b may receive an image from any one of the first camera 221a and the second camera 221b at user request.

The controller 180 may also control the other camera such that an image may be input through the other camera, while the image is being input from the other camera. The user request may be input to the mobile terminal as a touch input or a voice input.

The controller 180 may display a preview image of an image input from any one of the first camera 221a or the second camera 221b on the display unit 151. For example, as illustrated in FIG. 11A(1), the controller 180 may display a preview image 1100 of an image input from the first camera 221a on the display unit 151.

When a preset type of touch is applied to the preview image, the controller 180 may display a preview image of an image input from the other camera on the display unit 151. This preview image may disappear from the display unit 151. Here, the preview image of the image input from the other camera may be temporarily displayed while the preset type of touch is maintained.

For example, as illustrated in FIG. 11A(2), when double touches are applied to the preview image 12100 of the image input from the first camera 221a, the controller 180 may display the preview image 1100 of the image input from the second camera 221b on the display unit 151.

When the preset type of touch applied to the preview image of the image input from the other camera is not sensed any longer, the controller 180 may display the preview image of the image input from the one camera on the display unit 151. For example, when the touch touches applied to the preview image 1100 of the image input from the second camera 221b is not sensed any longer, the controller 180 may display the preview image 1100 of the image input from the first camera 221a again.

That is, in a state in which the preview image of the image input from one camera is displayed, the user may simply check the preview image of the image input from the other camera having an angle of view different from that of the one camera. When the preview image of the image input from the other camera is displayed in response to maintaining of the preset type of touch, when an additional touch is applied, the controller 180 may switch from the one camera to the other camera.

This switching of the camera refers to an operation of changing a main camera from any one camera to the other camera. The main camera may be a camera capturing an image when an image capture request is received on the current mobile terminal. For example, as illustrated in FIG. 11B(1), 11B(2), when the preview image of the image input from the second camera 221b is displayed while the double touches are maintained, the controller 180 may sense that a pinch out touch is applied subsequently after the double touches.

In response to the application of the pinch out touch, the controller 180 may change the main camera from the first camera 221a to the second camera 221b. In this case, even though the double touches are not maintained on the display unit 151, the controller 180 may display the preview image of the image input from the second camera 221b.

When images simultaneously captured through the first camera 221a and the second camera 221b are displayed through a gallery application, the controller 180 may display guide information indicating an image corresponding to the image captured through the first camera 221a on the image captured through the second camera 221b. For example, as illustrated in FIG. 12A(1), guide information 1220 indicating an image 1210a corresponding to the image captured through the first camera 221a on an image 1200 captured through the second camera 221b. That is, the user may simultaneously see the information related to the two images through the guide information.

When a touch is applied to the image 1210a corresponding to the image captured through the first camera 221a, the controller 180 may display the image 1210b captured through the first camera 221a on the display unit 151. Also, when a touch is applied to the image 1210a the controller 180 may display link images. These link images may be images detected from the memory 170 on the basis of an image capture time and an image capture location.

For example, as illustrated in FIG. 12A(3), when a touch is applied to the image 1210a corresponding to the image captured through the first camera 221a, the controller 180 may display the image 1200 captured through the second camera 221b and link images 1230 and 1240 having the same image capture location. Also, while video is being captured through the first camera 221a, when an image object corresponding to a specific subject included in the video satisfies a preset condition, the controller 180 may switch to the second camera 221b to capture video. The preset condition may be a condition in which the specific subject is included in an angle of view of the camera.

For example, as illustrated in FIG. 12B(1), while video 1260 is being captured, the controller 180 may sense that the specific subject 1260 is not included in the angle of view of the first camera 221a. In this case, as illustrated in FIG. 12B(2), 12B(3), the controller 180 may control the second camera 221b having an angle of view greater than that of the first camera 221a to capture video 1270.

After capturing of the video is terminated, the controller 180 may synthesize the video captured through the first camera 221a and the video captured through the second camera 221b to generate a single video.

As illustrated in FIGS. 12C(1), 12C(2), the controller 180 may extract video 1290b corresponding to a range of an angle of view of the first camera 221*a* from the video 1290*a* captured through the second camera 221*b*. Thereafter, the controller 180 may synthesize the extracted video corresponding to the range of the angle of view with the video 1280 captured through the first camera 221*a*. Thus, the user may view the video as if it has been captured through a single camera. A method has thus been described for capturing an image through cameras having different angles of view.

In an embodiment, by simultaneously capturing a still image and video through a plurality of cameras disposed on the rear surface (or other location) of the mobile terminal, a portion of the still image may be conveniently changed to video to generate a synthesized image. Thus, the user may obtain a cinemagraph image without undergoing a complicated procedure. In addition, by capturing moving and non-moving portions through separate cameras, precision of a cinemagraph image may be enhanced. Also, the user may obtain a clean cinemagraph image by setting a moving portion in a still image in advance before capturing an image, and performing capturing.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a main body comprising a front side and a rear side;
    a plurality of cameras located on the rear side, wherein the plurality of cameras include a first camera and a second camera;
    a display; and
    a controller configured to:
    cause the display to display a preview image received from the first camera, wherein the preview image includes a first object and a second object;
    capture a still image through the first camera and video through the second camera in response to one image capture request;
    set a first region of the still image as a first dynamic region of a synthesized image in response to a first touch input applied to the first region including the first object while the video is being captured;
    set a second region of the still image as a second dynamic region of the synthesized image in response to a second touch input applied to the second region including the second object while the video is being captured; and
    generate the synthesized image using the captured still image and the captured video,
    wherein the first dynamic region of the synthesized image is generated by synthesizing the first region of the still image and a portion of the captured video,
    wherein the second dynamic region of the synthesized image is generated by synthesizing the second region of the still image and another portion of the captured video,
    play back the first dynamic region of the synthesized image during a first time period in response to receiving of a message from an external terminal, wherein the first dynamic region of the synthesized image is associated with a message application; and
    automatically play back the second dynamic region of the synthesized image during a second time period after the first time period without selection of the second dynamic region,
    wherein the first time period is set as a period between a time point at which the first touch input is applied and a time point at which the second touch input applied, and
    wherein the second time period is set as a period between the time point at which the second touch input applied and a time point at which the capturing of the video is stopped.

2. The mobile terminal of claim 1, wherein the controller is further configured to:
    cause the display to display guide graphic objects respectively indicating the first object and the second object.

3. The mobile terminal of claim 1, wherein the controller is further configured to:
    control the second camera to set a focus on a first subject corresponding to the first object or a second subject corresponding to the second object.

4. The mobile terminal of claim 1, wherein the controller is further configured to:
    cause the display to display the captured still image;
    cause the display to display a guide graphic object in association with the first object and the second object, wherein the guide graphic object indicates existence of the captured video.

5. The mobile terminal of claim 1, wherein the controller is further configured to:
    cause the display to display a home screen that includes a background image, wherein the background image is the synthesized image.

6. The mobile terminal of claim 5, wherein an application is associated with the first dynamic region of the synthesized image; and wherein the controller is further configured to:

cause the playing of the captured video at the first dynamic region of the synthesized image according to an event that occurs in the application.

7. The mobile terminal of claim 6, wherein the controller is further configured to:
cause the playing of the captured video at the first dynamic region of the synthesized image at a speed that corresponds to a number of events that occur in the application.

8. The mobile terminal of claim 5, wherein the controller is further configured to:
cause the playing of the captured video at the first dynamic region of the synthesized image at a speed that corresponds to a threshold value of battery capacity of the mobile terminal.

* * * * *